Aug. 9, 1955   F. J. HOOVEN   2,714,843
PHOTOGRAPHIC TYPE COMPOSITION
Filed June 19, 1951   13 Sheets-Sheet 1
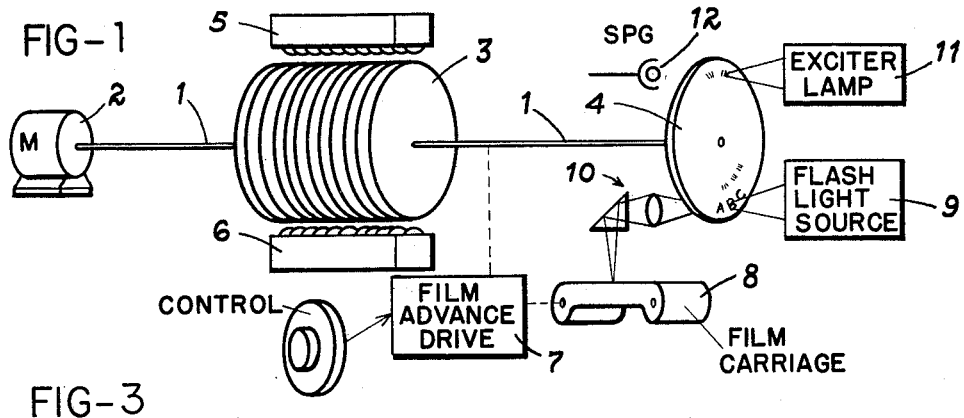
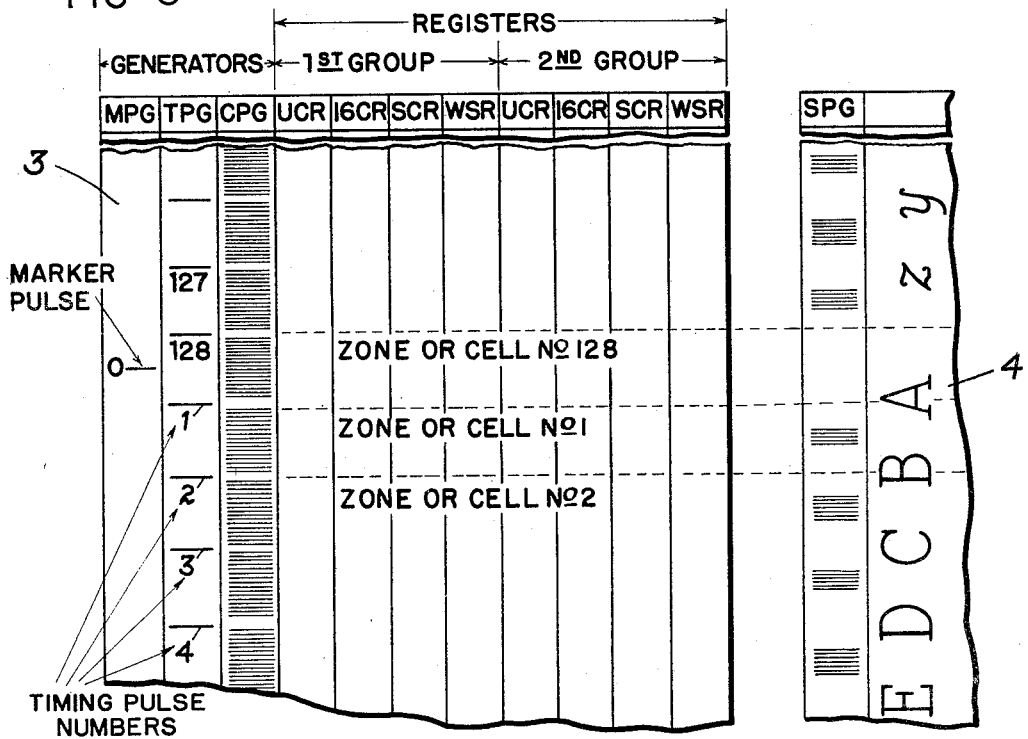
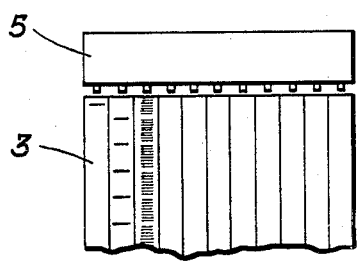
INVENTOR.
FREDERICK J. HOOVEN
BY Marechal & Biebel
ATTORNEYS Aug. 9, 1955 F. J. HOOVEN 2,714,843
PHOTOGRAPHIC TYPE COMPOSITION
Filed June 19, 1951 13 Sheets-Sheet 3
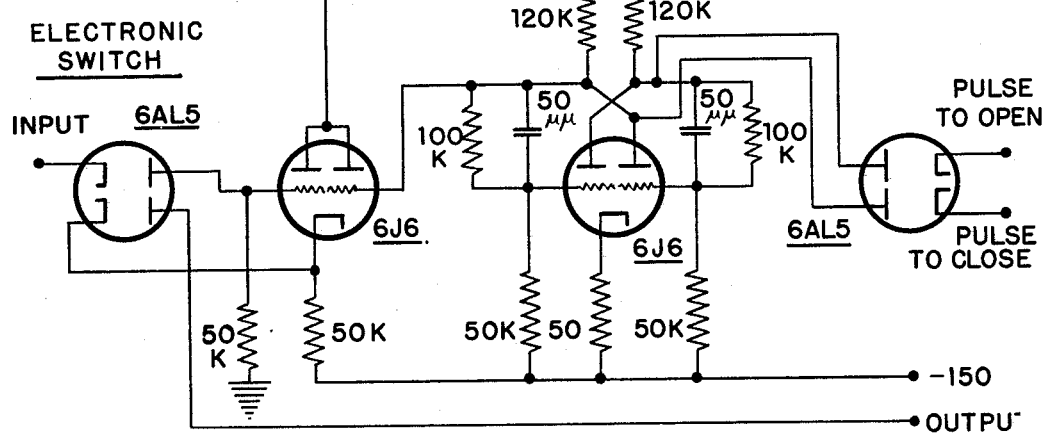
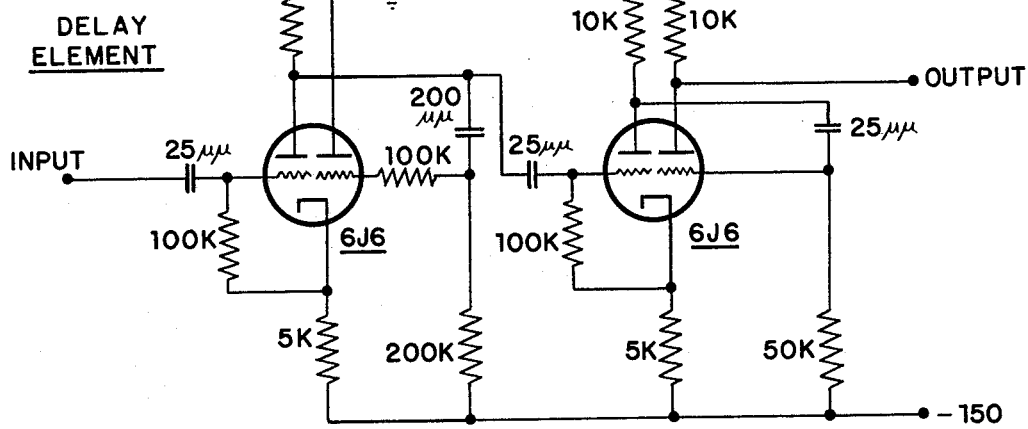
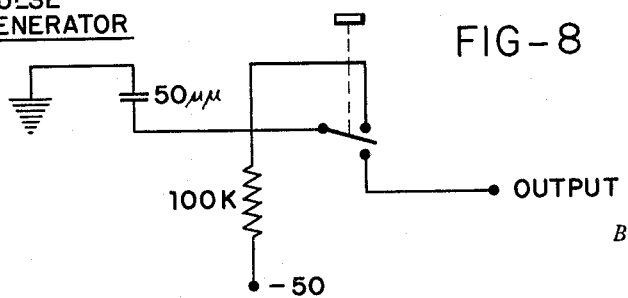
INVENTOR.
FREDERICK J. HOOVEN
BY
Marechal & Biebel
ATTORNEYS Aug. 9, 1955     F. J. HOOVEN     2,714,843

PHOTOGRAPHIC TYPE COMPOSITION

Filed June 19, 1951     13 Sheets-Sheet 7

SEQUENCE SWITCH

INVENTOR.
FREDERICK J. HOOVEN
BY Marechal & Biebel
ATTORNEYS

Aug. 9, 1955  F. J. HOOVEN  2,714,843
PHOTOGRAPHIC TYPE COMPOSITION
Filed June 19, 1951  13 Sheets-Sheet 8

*INVENTOR.*
FREDERICK J. HOOVEN
BY
*Marechal & Biebel*
ATTORNEYS

Aug. 9, 1955  F. J. HOOVEN  2,714,843
PHOTOGRAPHIC TYPE COMPOSITION
Filed June 19, 1951  13 Sheets-Sheet 9

INVENTOR.
FREDERICK J. HOOVEN
BY Marechal & Biebel
ATTORNEYS

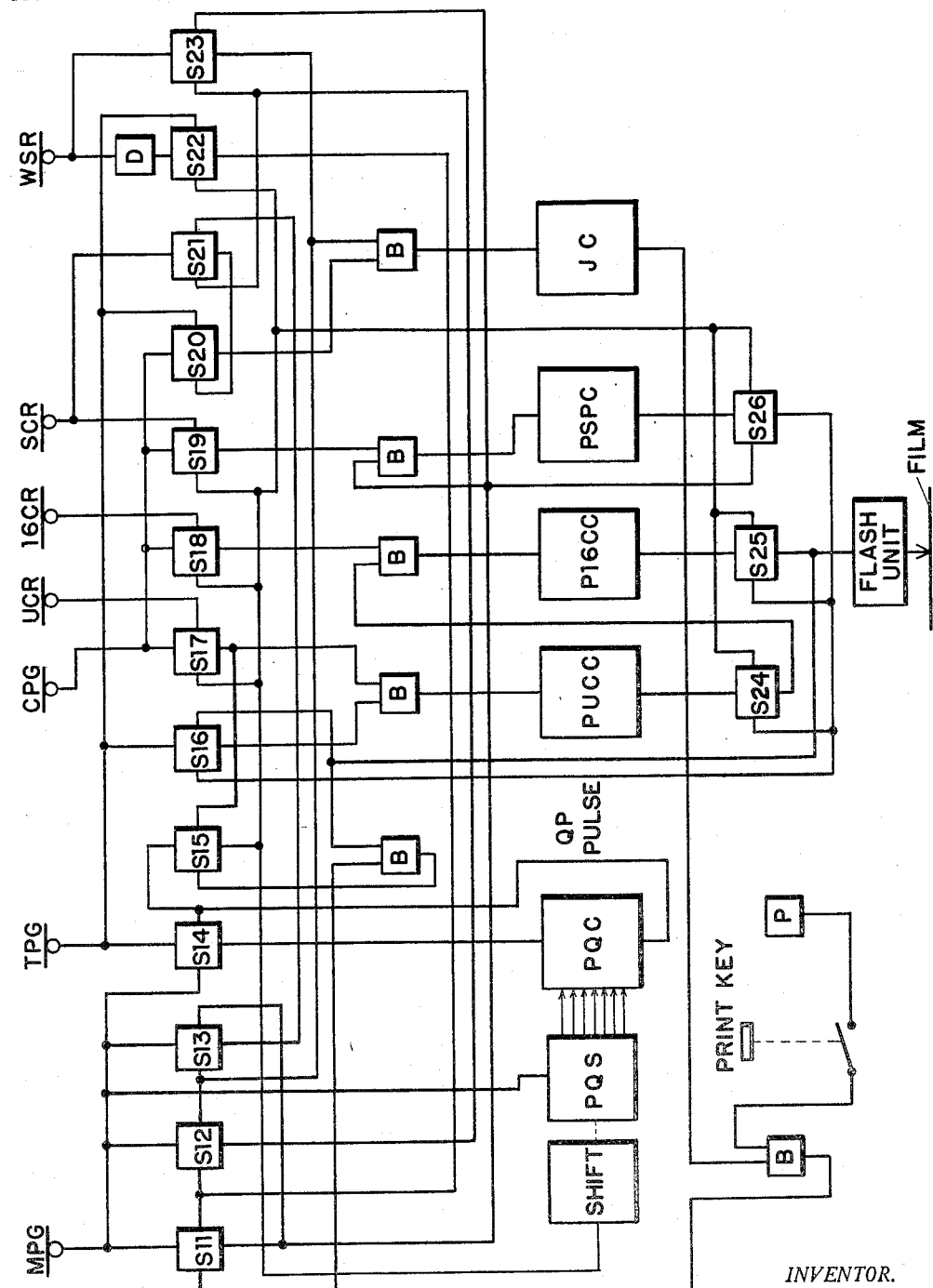

Aug. 9, 1955  F. J. HOOVEN  2,714,843
PHOTOGRAPHIC TYPE COMPOSITION
Filed June 19, 1951

*INVENTOR.*
FREDERICK J. HOOVEN
BY Marechal & Biebel
ATTORNEYS

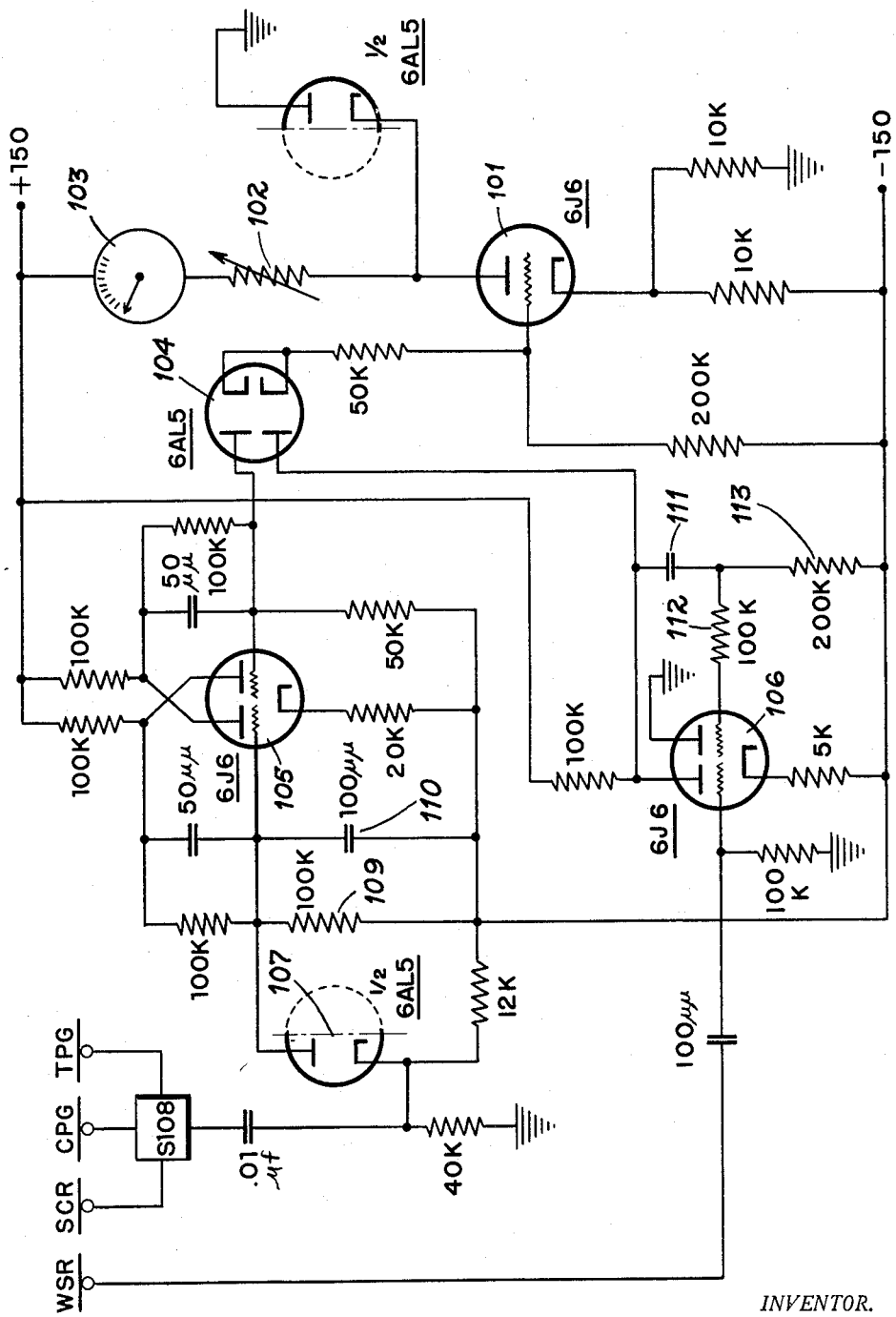

United States Patent Office 2,714,843
Patented Aug. 9, 1955

2,714,843

PHOTOGRAPHIC TYPE COMPOSITION

Frederick J. Hooven, Dayton, Ohio, assignor to Harris-Seybold Company, Cleveland, Ohio, a corporation of Delaware Application June 19, 1951, Serial No. 232,276

49 Claims. (Cl. 95—4.5)

This invention relates to photocomposition and more particularly to a system for producing on photographic film an image of typed composition of predetermined length of line and point size of type, properly justified and leaded.

It is one of the objects of the invention to provide a photocomposing system which operates rapidly, accurately and reliably, which utilizes a minimum of intermittently operating mechanism, which is small and compact and which is flexible and adaptable in use such that it can handle many different types of composition.

It is also an object to provide such a system including recording mechanism having a plurality of cells or zones arranged in predetermined sequence and each occupying a predetermined angular extent in which pulses are arranged to be recorded and picked up in definite relation to the position in the cell or zone in accordance with a prearranged code relationship.

It is a further object to provide simple and effective means for erasing characters from the selected line before the line is printed, and to provide for erasing selectively a particular character, all characters following a particular character, or an entire line.

It is also an object to provide a system for recording data indicative of a sequence of characters in a line of composition and of the widths of such characters, and for thereafter selectively erasing either the data identifying the character, or the data indicative of the width of that character, or both.

It is a still further object to provide such a system in which the width of the composed line may be adjusted independently of the size of the characters being printed so that variations may be made in the point size of the type on the film without change in the line width.

It is also an object to provide such a system which makes it possible to properly set many different types of material including headings, tabular matter, single characters in columns, complex matter with subscripts, superscripts, non-standard spacings, and the like.

Other objects and advantages will be apparent from the following description, the accompanying drawings and the appended claims.

In the drawings:

Fig. 1 is a diagrammatic view of the principle parts of the rotating system including the space code register on which the characters and the data indicative of the individual width thereof are carried as well as the two groups of generators and registers by means of which the recording and printing of the characters in proper time and space relationship is accomplished;

Fig. 2 is an elevational view showing the relationship between the generator pickups, the recording heads, and the magnetic recording drum forming part of the rotating system;

Fig. 3 is a developed view showing a portion of the drum and the space code generator with typical cell or zone positions being indicated thereon;

Fig. 5 is a diagrammatic view of the circuit for an electronic switch;

Fig. 7 is a view showing a delay element circuit;

Fig. 8 is a circuit diagram of a static pulse generator;

Fig. 17 is a circuit diagram showing the circuits which provide for the printing of the characters;

Fig. 21 is a diagrammatic view of the circuit providing for indicating the percentage of set in the line;

Figure 4:
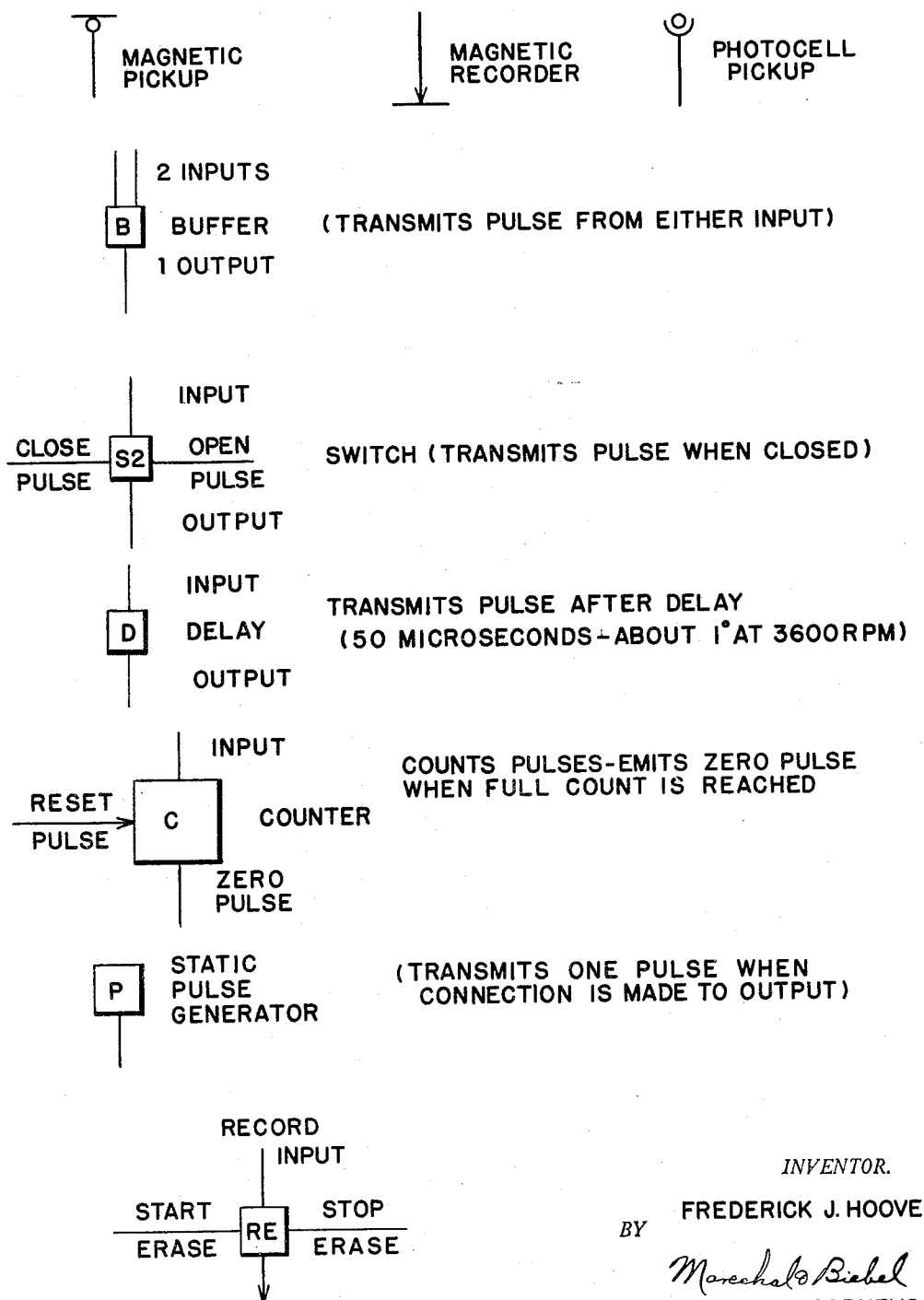
Fig. 4 is a view showing the symbols employed in the various elements of the system.

The machine is provided with a continuously rotating system including a recording drum and a character carrier in the form of a master stencil or the like carrying the characters as transparencies and arranged for continuous relative rotation with respect to a flashing light source of extremely short duration. For purposes of illustration and as a preferred embodiment the character carrier is in the form of a drum or disk on the rim of which the characters are carried and rotated continuously and at high speed past the stationary light source which may be a gas discharge lamp or spark. Both the lamp and spark give a flash of light of high intensity and extremely brief duration, as required to effect the flashing of the selected character without blurring.

The film also moves in translation in a continuous predetermined fixed relation with the rotation of the drum, as distinguished from an intermittent travel between successive flashings of the selected characters, and preferably in the direction tangent to the rotation of the drum. The characters are arranged in a single row on the stencil up to the maximum number in any one font, such as approaching 120, including all three cases with special symbols. Different fonts may be arranged in other axially spaced rows on the character carrier and arranged to be brought selectively into proper flashing relation with the film by suitable manual or automatic controls and adjustments. The character carrier, the moving film and the magnetic recording drum comprising the register and pulse generators as hereinafter described thus constitute a continuously rotating, self-synchronous system. The character carrier may be readily removed from its drive shaft on which it is keyed and replaced by another with different fonts and in which the characters may have any desired widths.

As a result of the fixed relation between the rotation of the character carrier and the continuous translation of the film, the smallest increment of character space measurement permitted by the machine is the distance traveled by the film in one revolution of the drum. For convenience, this space is referred to throughout as an "iota," or an "i." By suitable change in the ratio between the rotation of the character drum and the amount of film advance, provision is made for varying the linear dimensions of this unit, as may be desired for different fonts and point sizes of type, a suitable relation being about 8 i per em.

Assuming a datum line on the rotating character drum to be considered as the zero angle position, the projection of this line on the film for each drum revolution would be the mark of the i space, and each character on the drum will be printed with a fixed relation to this line regardless of its angular position on the drum. This is accomplished by having each character slightly displaced from the optical axis at the instant of the flash, this displacement being proportional to the angular position of the character on the drum.

It will thus be seen that character selection is measured in fractional portions of a single revolution, that is, by determining the precise instant in the revolution at which the flashing of the light source occurs. Character spacing, on the other hand, is measured in whole revolutions of the system, there being a predetermined number of complete revolutions of the system for each character, depending upon the width or number of space units of that character. The system proceeds to the selection of the next succeeding character only after the completion of the desired number of full revolutions, and thus each character is properly selected and the film properly advances in proportion to the width of that character while the entire system is in continuous rotation.

Similarly when a word space occurs the system provides for continuance of the rotation of the system for a larger number of complete revolutions, thereby advancing the film by a greater amount before returning to its character selecting function, thus forming a space between the last character of one word and the first character of the next word in the line.

In order to accomplish justification or composition of equal length lines of type, the length of each word space is determined by suspending the process of printing and spacing of characters and the following operation is performed whenever a word space occurs: The total number of spaces occupied by all the previously recorded characters of the line is counted once, then the total number of word spaces (which has been previously recorded) is counted repeatedly, once during each revolution of the system until the total count equals the predetermined total available space in the line. This total count will usually not coincide exactly with a complete number of revolutions and thus will be reached during one revolution of the system, and character printing will be resumed at the end of this revolution. If the total count is exceeded during the completion of this revolution the excess count is retained until the next succeeding word space occurs and the count which takes place at that time starts with this initial count. The same complete operation of counting character and word spaces takes place upon the occurrence of each word space and in this way the line is justified for printing.

The maximum speed of the machine is determined by the maximum permissible speed of the character drum, this being established by the duration of the light flash during the exposure. A speed of 60 revolutions per second gives a printing speed of 60 i per second, equivalent for example to 7½ ems per second, or an average of about 10 characters per second.

The system utilizes electronic control circuits and they are primarily arranged so that they do not require proportional or variable control, but are actuated only into the On or Off position, where they are either conducting or non-conducting. This provides for a high degree of reliability and accuracy, as well as assuring high speed operation.

The electronic mechanisms are largely opearted by and are used to produce electronic pulses. A pulse is here defined as a brief duration of current or voltage in a circuit otherwise not energized. In the present system the pulse is not measured quantitatively but merely its presence or absence is utilized to control the electronic mechanisms. All operating data from the machine is translated into pulses which by their number and timing establish the timing of the light flash within a single revolution and with the proper interval to allow a definite whole number of revolutions of the system which determines the selection and the spacing of the printed characters.

The operator sits at a keyboard such as the ordinary typewrtier keyboard or other comparable arrangement displaying the proper number of characters in two or more cases and types the line of composition which appears on a typed sheet in front of him as in conventional typewriter technique so that he can check the copy for accuracy. After it has been determined that the typed line is accurate, the operator presses a print key which results in the line so formed being printed in justified form upon the film, and the typewriter carriage returned to its left-hand margin and the paper therein is properly advanced in preparation for typing a second line. Alternatively in place of the actual keyboard the mechanism may be actuated automatically by any desired remote control such as a wire or tape control providing for the operation of the machine from a remote point. Controls are also provided by means of which the operator can dispense with the normal spacing procedure and provide for the insertion of a non-standard spacing of a predetermined width.

Reference is made to applicant's copending application Serial No. 205,576 filed January 11, 1951, which shows many similar features and the present description will be supplemented by consideration throughout of said copending application.

The general arrangement of the rotating system and related parts is shown in Fig. 1. The shaft 1 is driven by motor 2 and carries magnetic drum 3 and character disk 4 on which are carried both the characters and their characteristic space information. Mounted at 5 are the eleven magnetic units used for character data recording comprising three magnetic pickups for the permanently recorded pulse generators, and eight record-erase heads for the two groups of four magnetic registers.

Shown at 6 is a corresponding group of 11 pickup units used in the printing process, three of these being used for picking up the permanent pulses with eight pickups for the two groups of registers.

Driven from shaft 1 through variable film advance drive 7 is film carrier 8 which is thus caused to advance uniformly along the direction of the composed line in selectively timed relation to the rotation of shaft 1.

Film advance drive 7 is shown diagrammatically only, but many known types of mechanism may be adapted for this purpose, such as the lead-screw drive shown in said copending application.

Coacting with the character disk 4 is flashing light source 9 and optical system generally indicated at 10 by means of which characters are projected or flashed on the film carried by carrier 8. Exciter lamp 11 acts with photocell pickup 12 to form electric pulses in accordance with the space information carried on disk 4.

*Description of elements*

In Fig. 4 are shown the symbols which are used throughout the specification to better describe the system and its functioning. The magnetic pickup, the magnetic recorder and the photocell pickup are indicated diagrammatically as shown and may comprise conventional forms of such apparatus or may be in the form described in said copending application.

The buffer is indicated as such at B and has two inputs with a single output, providing for transmitting a pulse from either input to the output. A typical circuit for a buffer is shown in said copending application. Both the buffer and the switch (indicated as S1, S2 etc.) are preferably electronic elements, the switch closing its output circuit in response to a closing pulse and opening its output circuit in response to an opening pulse. These elements may be of the type described in said copending application or as shown in Fig. 5, suitable specific constants being shown for this and others of the elements so that the element can be built on the basis of such showing and will operate as desired. In all of these diagrams resistances are shown in ohms, K indicating 1000, and capacities in microfarads mf. or micro, microfarads, mmf. The electronic switch shown in Fig. 5 is substantially similar to that shown in copending application with the omission of the opening pulse circuit, the use of the rectifier circuits in the input and "pulse to close" and "pulse to open" circuits.

Figure 6:
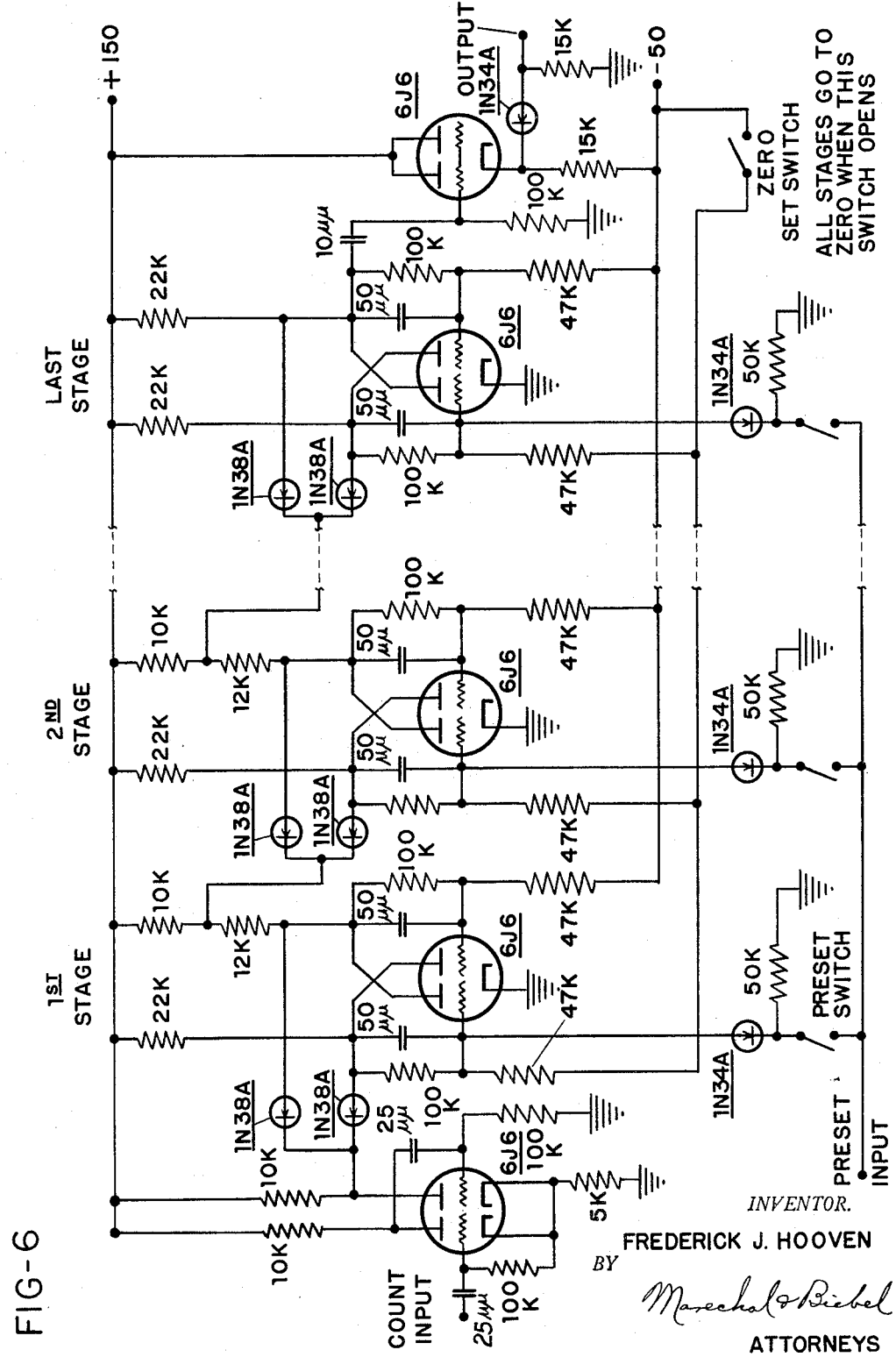
Fig. 6 is a diagrammatic view of a typical counter circuit.

The counters C are of various types and provide for counting input valves and emitting a single or zero pulse when a full count is reached. The counters may be preset by suitable means so that they will reach their full count following any desired number of input pulses, and they are arranged in some cases as 4-stage binary counters, and in other cases as 5, 6 and 7-stage counters respectively. These counters may likewise be of known construction per se and typical counter circuits are shown in Fig. 6 and in said copending application.

In all the accompanying figures where two signals are employed alternatively to energize a single input circuit buffers are shown. However whenever electronic switches such as shown in said copending application or counters having output circuits such as shown in Fig. 6 form the source of the alternative signals, there will be many instances where no buffer will be required since the output rectifiers in such switch and counter circuits perform the function of the buffer.

The delay element D is also essentially an electronic switch and is similar to the switches S except that it provides for a delay in the transmission of its output pulse following the input pulse, a suitable delay for purposes of the present invention being about 50 microseconds or about 1° at the suggested speed of operation. The complete circuit of a suitable delay element is represented in Fig. 7 which is complete with suitable specific data so that as stated above it can be built and will operate in the manner desired.

The static pulse generator P is any device such as a condenser circuit charged through a resistor which provides for transmission of a single pulse when connection is made to its output. Upon being disconnected it will recharge and be in condition to then transmit another pulse. A typical circuit for such a generator is shown in Fig. 8.

Figure 9:
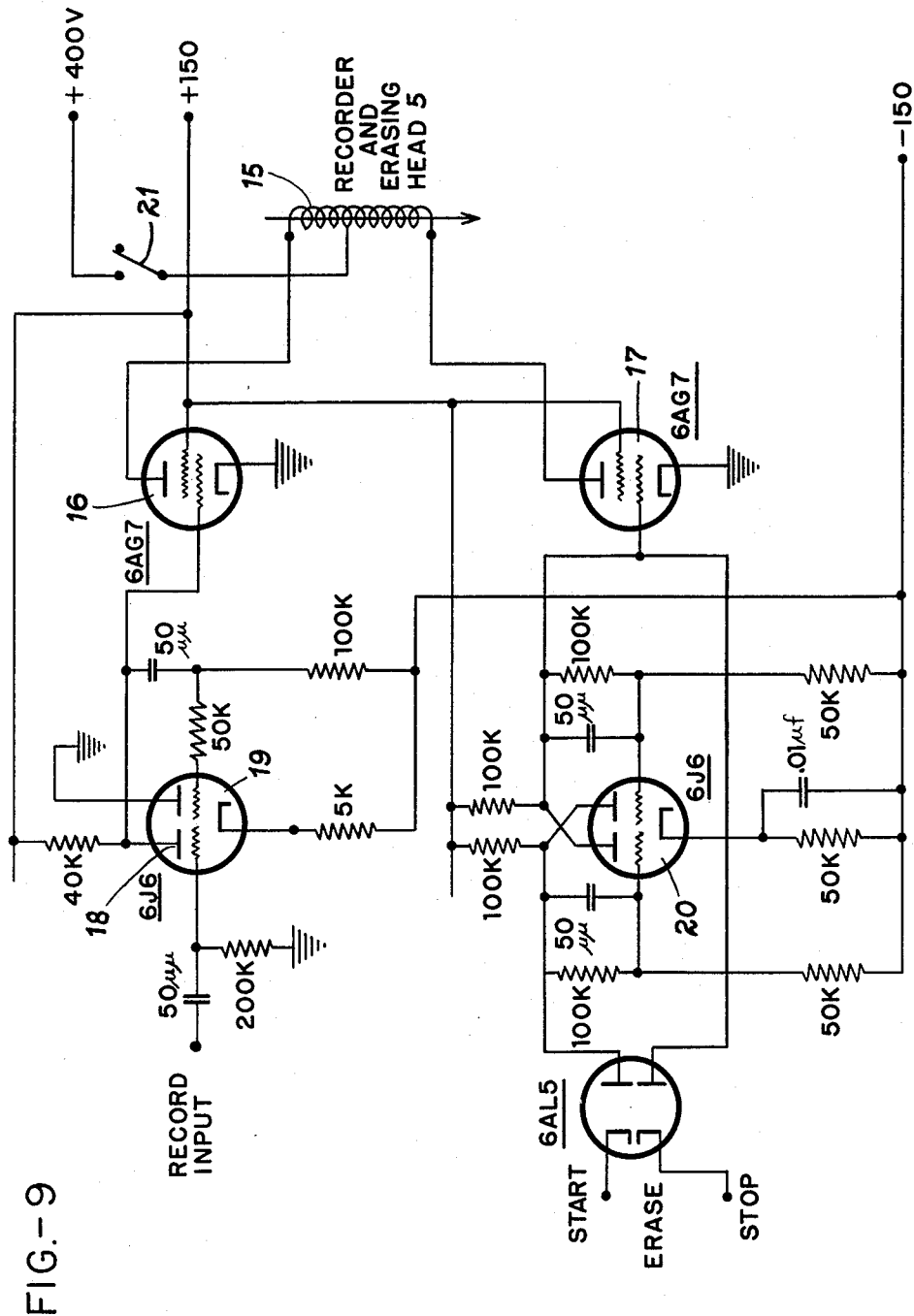
Fig. 9 is a diagram showing the circuit for the combined recorder and erasing head.

The Record and Erase unit RE is an electronic unit more fully illustrated in Fig. 9, having an input for recording, a control providing for the start of the erasing action and another control providing for the stopping of the erasing function.

Coil 15 of the magnetic head 5 is connected at its center tap to the power supply of 400 v. The 6AG7 tube 16 is connected to the coil 15 in such polarity that when tube 16 is conducting, magnetic flux will pass through head 5 in such a direction as to record on drum 3, while tube 17 when conducting will cause the flux in head 5 to flow in the opposite direction thus erasing by saturating the magnetic material on drum 3 in the opposite magnetic polarity from that of the recorded pulses.

Recording tube 16 is normally maintained in a non-conducting state, being connected to the plate 18 of pulse generator tube 19. The cathode of tube 19 is maintained at a high negative potential and plate 18 will normally be conducting and will be maintained at a sufficient negative potential to prevent current flow in tube 16. Tube 19 will be recognized as a common form of univibrator, or one-shot multivibrator, and in response to a negative pulse at the record input will impress on the grid of tube 16 a brief positive pulse, thus recording a pulse on drum 3.

Tube 20 and associated circuit will be seen to be a flip-flop circuit. The grid of tube 17 is connected to one plate of tube 20, and when that plate is in the non-conducting state, which will be called the On state, tube 17 will conduct and while it is conducting, head 5 will erase.

Flip-flop 20, like other flip-flops herein described, may be caused to rest in either the On or Off state in response to pulses received at the Start Erase and Stop Erase inputs, and any data recorded in any cell of one of the registers may be selectively erased by the application of suitably timed pulses to these inputs.

Fig. 2 shows how drum 3 is divided into eleven circumferential tracks, each track being magnetically related to a magnetic head comprising the group 5, at one position and to a magnetic head of group 6 at another circumferential position.

Fig. 3 is a development of a portion of the surface of drum 3 showing the relative locations of the permanently recorded pulses of the various generators, and the boundaries of the angular zone divisions, or cells, into which the surface is divided. The vertical lines in Figs. 2 and 3 are diagrammatic and do not necessarily appear on the actual drum. The horizontal lines appearing in the MPG, TPG, and CPG tracks represent the location of permanently recorded pulses which may be recorded by actually scribing the magnetic material in the desired spot, but which are diagrammatic in the figure. The dotted lines do not appear on the actual device but have been added merely to indicate the boundaries or limits of the several cells.

The magnetic heads 5 and 6 and the drum 3 shown in Figs. 1 and 2 are used for magnetic recording, pickup, and erasing. Each head is generally similar to those widely used in the magnetic recording of sound on wire and tape with modifications necessary for the handling of higher frequencies. The head may comprise a laminated magnetic core structure separated from the drum by an air gap which is of the order of .003 inch. The core structure is held in close proximity to the rotating disc or drum 3 which is of nonmagnetic material such as bronze covered with a thin surface coating of magnetic material which may be finely divided iron oxide powder with a suitable binding agent or a thin electroplated coating of suitable magnetic material of the order of thickness of the coating of .0002 inch. As described more fully in said copending application, a magnetic pole is recorded on the surface material of the drum whenever a pulse of current is passed through the coil of such a magnetic head. And, conversely, when a magnetically recorded pulse passes beneath such a head a voltage pulse is induced in the pickup coil thereof.

During subsequent operation whenever one of these poles passes a head a voltage will be generated in the coil thereof generating a pulse of voltage of wave form generally similar to the impressed current of the recording process above described. As an example, drum 11 may have a circumference of 30 inches and rotate at a speed of 60 revolutions per second. The linear speed of the coated surface past the magnetic gap will be then 150 feet per second. It has been found practicable to record as many as 1000 separate such magnetic poles per foot by these methods and it is therefore practicable to record 150,000 distinct pulses per second. By passing a direct current through the coils of the recording heads in the opposite direction from that normally used in the recording of pulses it is possible to magnetize the magnetic material on the drum to the point of saturation which wipes out all previously recorded magnetic poles and thereby erases the recorded pulses and leaves the magnetic circuit ready to receive newly recorded pulses. In the following circuit diagrams the magnetic head generally described above, including power supplies and amplifying circuits as described hereinafter, is represented in Fig. 4 by the three different symbols shown as part of the figure for the several different purposes of recording, pickup, and erasing.

The magnetic recording and pulse generating system consists of the drum 3 on which there are three magnetic tracks having permanently recorded pulses thereon as shown in Fig. 3 which shows the marker pulse generator henceforth abbreviated MPG having one pulse which marks the zero degree or datum line position of the system. The timing pulse generator or TPG has one pulse for each character on the character disk which thus mark the limits of the several cells. In Fig. 3 these pulses are represented as being at intervals of 2.81° with 128 pulses in all. The code pulse generator CPG has a group of 16 pulses contained within each of the 2.81° intervals between timing pulses. These three groups of pulses are permanently recorded and together with their respective pickup heads and associated amplifiers may be called the Generators.

In addition there are two groups of four tracks each on which the required printing data is recorded as each line of composition is formed, and from which the data is erased after the line has been printed. Together with their pickup heads, they are called the Registers. Each group of four registers consists of the units code register UCR, the sixteens code register 16CR, the space code register SCR and the word space register WSR. In normal operation these groups are used alternately for recording and printing. As the operator types a line of composition one group of magnetic registers will be employed for recording that data while the one previously recorded is being used to control the printing of the line which is taking place concurrently. There are consequently a total of eleven magnetic recording tracks on the drum 3. It will be understood that all eleven recording and reproducing heads are axially aligned with one another, and that each cell is considered as extending axially across the entire width of face of the registers.

In addition, on the character disk itself shown at 4 there is a track of permanently recorded pulses having thereon a group of pulses for each character on the disk, each group containing a number of pulses corresponding to the alloted width in space units of one character. This is referred to as the space pulse generator SPG and it is on the character disk 4 rather than on the magnetic drum 3 for the reason that it then becomes possible to accommodate various fonts of type each having its own individual space allotment characteristics and the machine is not therefore limited in any way in the matter of possible type design. The character carrier or disk 4 rotates synchronously with the drum 3 and as a part of the continuously rotating system being operated at suitable speed by drive motor 2. Since the system is self-synchronous, the exact speed of rotation is not critical.

Any or all of the generators may be recorded magnetically or they may be recorded photographically and picked up by optical methods. In any case it is preferred that the SPG be formed photographically and be picked up by optical methods of reproduction using an exciter lamp and photocell pickup light such as used in sound film reproduction. It is thereby possible to reproduce the image portion of the character disk by a single photographic operation thus making possible a low cost font of type. The complete rotating system may conveniently be regarded as divided into 128 separate sections each of equal angular extent, each of which sections is herein referred to as a zone or cell. The cells thus each have an angular extent of 2.81° in the embodiment shown. These cells may be arbitrarily numbered from the marker pulse which is at the midpoint of cell No. 128, the first cell thereafter being No. 1 and so on (Fig. 3). The timing pulses will be referred to by numbers corresponding to the number of the cell following the timing pulse; therefore No. 1 timing pulse is that which immediately follows the marker pulse.

Figure 23:
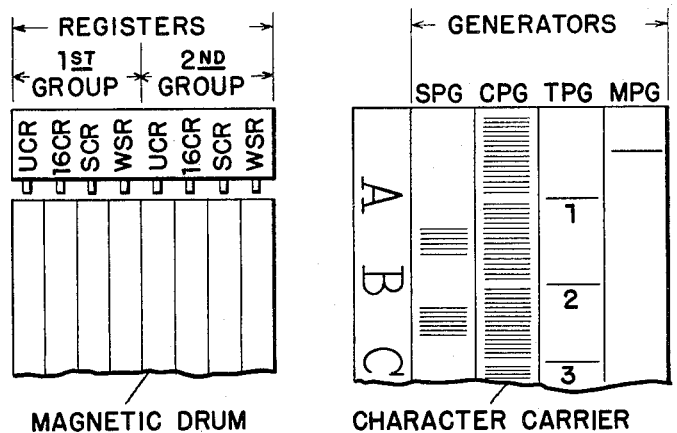
Fig. 23 is a diagrammatic development of a modified arrangement of the recorders and pulse generators.
Figure 24:
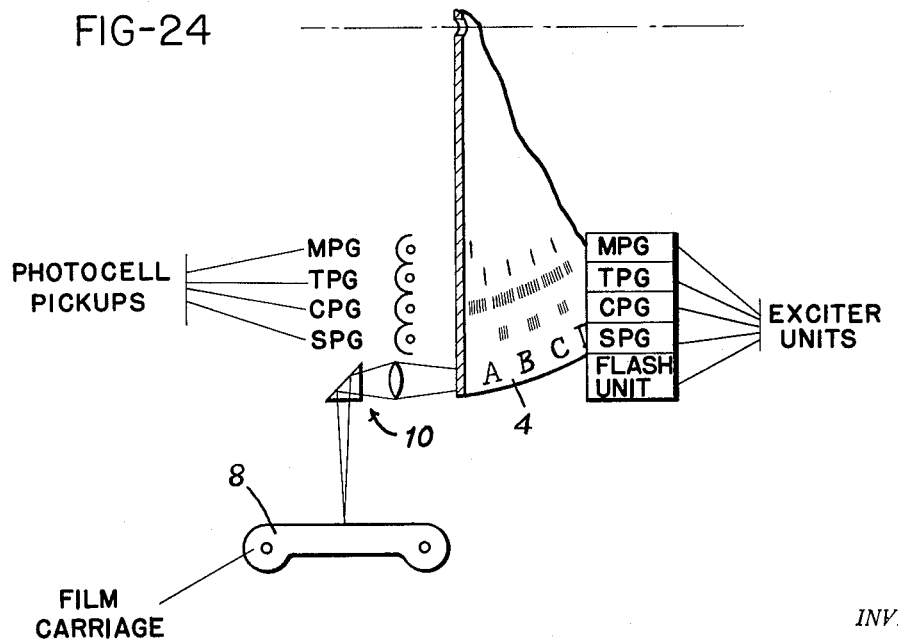
Fig. 24 is a schematic representation of the modified arrangement of Fig. 23.

Figs. 23 and 24 show a modified arrangement in which the magnetic drum embodies only the first and second groups of registers. The generators, i. e., the marker pulse generator, the timing pulse generator, and the code pulse generator in this arrangement are associated with and form an integral part of the character carrier. As shown in Fig. 24, the pulses may be in the form of opaque marks on a transparent disk (or vice versa), and are arranged in different radial positions along with the space pulse generator. The order in which the several generators appear on the disk may be varied at will, and it may be found desirable for example to locate the code pulse generator in the outer radius, adjacent the characters themselves, because it has the larger number of recorded pulses.

The exciter units in this case are arranged at one side of the disk, cooperating with the series of light sensitive cells on the opposite side of the disk, in the same manner as described above in regard to the space pulse generator.

An advantage of this modified construction is the fact that the system is more flexible, in that the entire set of permanently recorded pulse generators may therefore be produced economically by photographic methods for each particular font as desired.

The data for the recorded line is recorded in the four magnetic tracks of the register. This data is recorded in the form of code numbers by a method to be described, that for any one character occupying one cell on one or the other group of registers. The data for the first character in the line will be recorded in the first cell and that for the second character of the line in the second cell, etc.

In referring to the character disk 4 and to the space pulse generator SPG which is a part thereof it will be seen that each cell corresponds to a particular character such as for instance the first cell to the letter A, the second cell to the letter B, etc. It will be seen therefore that in the process of recording character data it is necessary to select two different cells in the sequence of operation. That is, it is first necessary to select the cell corresponding to the selected character in order to obtain from the SPG the necessary space data for that character, and then necessary to select the cell corresponding to the sequence of that character in the composed line, in order to record the code data for the character and its spacing in that cell position.

The terms "zone" and "cell" are used interchangeably herein to define a predetermined angular portion of the circumference of the character carrier, the pulse generators and registers extending over one or more tracks, in which are located the separate characters, the pulse data for selecting and recording each separate character and word space, as well as that for generating pulses for counting and control purposes, each zone occupying a definite position such that pulse data may be recorded therein and coded in relation to the spacing from the boundaries of the zone.

Recording operation

Figure 10:
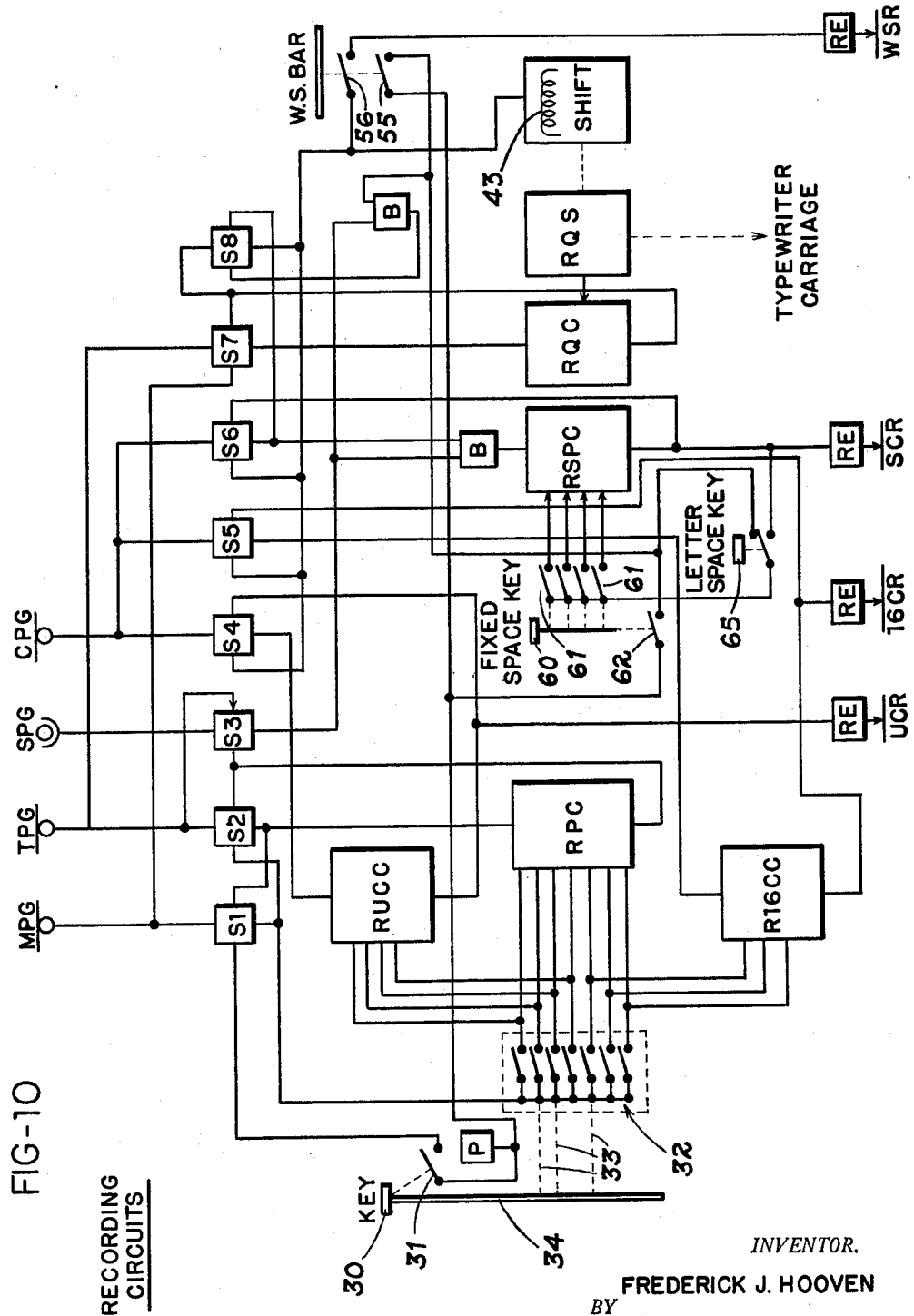
Fig. 10 is a schematic view of that portion of the circuit arrangement which provides for recording data indicating the characters, their position in the line, and the word spaces.

The recording operation takes place in response to the operation of a selected key on the keyboard with the carriage being in a predetermined position, assumed for example as at its left-hand margin. The complete system is shown in Fig. 10 and a portion thereof in Fig. 11. For purposes of illustration a single such key is shown at 30 in Fig. 10 having a key switch 31 which closes when the key is depressed. Such operation results in the transmission of a pulse from the static pulse generator P to cause the closing of switch S1. The first marker pulse thereafter initiates the counting process and causes the simultaneous closing of switch S2. It will be seen that the first timing pulse through S2 will open S1 so that even though the key is held in depressed position, only a single such marker pulse is transmitted. Since the marker pulse occurs only once during the revolution of the system it will be evident that this pulse orients the control with the rotating system and determines the beginning of the cycle of revolution thereof.

Figure 11:
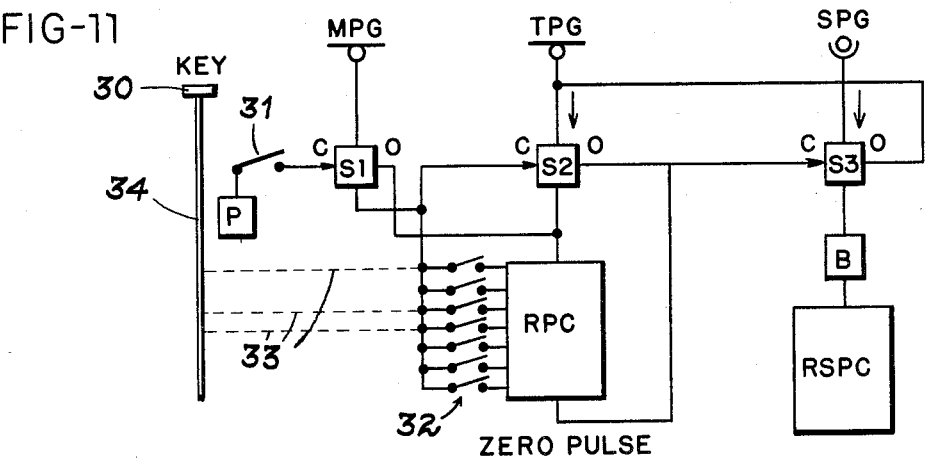
Fig. 11 is a portion of the circuit which provides for selecting and storing the data indicative of the width of each selected character.
Figure 13:
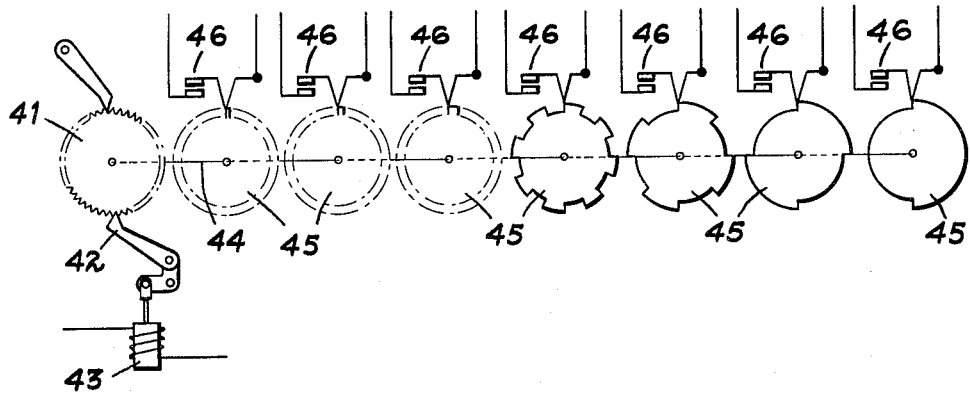
Fig. 13 is an exploded view of the multi-position selector switch which is actuated in accordance with the position of the carriage or other selecting controls to determine the setting of certain of the counters.

As shown in Fig. 11 there is a counter identified as a recording position counter RPC which is a 7-stage binary counter having 7 reset switches. As described in said copending application, such counter may be preset to any desired number from zero to 127 by closing selected ones of its 7 switches indicated at 32. The means for accomplishing such coded closing of the switches is well-known and is indicated by the dotted lines 33, connected to the stem 34 of the particular key 30. It will be understood that each key is provided with a set of such actuating elements providing for the presetting of the switches with a different pattern for each individual key.

With electronic switch S2 closed by the marker pulse as above described and the counter RPC preset to a predetermined number as determined by the actuation of a particular key 30, the timing pulses from the TPG which are produced one at the beginning of each cell position are counted into the counter RPC until the total therein reaches 128, at which time the counter returns to its zero position and emits a zero pulse. It will be obvious that this zero pulse may be generated in any desired cell position corresponding to any selected timing pulse of number N by setting the counter RPC to the number 128—N. For instance if it is desired to select a pulse corresponding to the tenth timing pulse the counter will be preset to the binary equivalent of the number 118 following which the tenth timing pulse will institute the operation above described.

Upon emission of the zero pulse, it will be seen that that pulse causes the opening of switch S2, thereby terminating further counting of the timing pulses, and simultaneously causes the closing of electronic switch S3. Switch S3 remains closed for only one cell position, being opened by the next occurring timing pulse from the TPG. It will be thus seen that switch S3 will close shortly after the beginning of any selected cell and will open at the end of that cell.

The space pulse generator SPG is shown connected to the input of switch S3, the output of which goes through buffer B and the recording space pulse counter RSPC. Fig. 11, therefore, shows a system by which the particular cell of the SPG in which there is recorded the data corresponding to the selected character, may be picked out during the continuous rotation of the system, and the number of pulses recorded in that cell which corresponds to the width of that particular character in the font being used, may be collected, counted into and stored in the RSPC. It will thus be evident that in this way the actuation of any one of the keys 30 will result in the collection and incorporation into the RSPC of a count corresponding to the width of the particular character so selected.

Figs. 12 to 15 show the means used for selecting the cell of the register corresponding to the order of the character in the line, that cell being referred to as the sequence cell. The operation is controlled in direct correlation with the position of the carriage, the sequence cell so selected being the same in order on the register drum as the space position occupied by the typewriter carriage at any particular time. This selection is accomplished through relating the typewriter carriage 40 (Fig. 12) to a recording sequence switch RQS. This switch is shown in a developed view of a typical embodiment in Fig. 13 in which the ratchet wheel 41 with its cooperating ratchet 42 is arranged for automatic shift or carriage advance under spring or other suitable drive as may be desired. Ratchet 42 may be solenoid actuated as shown at 43 to allow the wheel 41 to advance one notch or character position each time it is energized. The shaft 44 of the ratchet wheel 41 carries a number of cams indicated at 45 each of which has twice the number of lobes as the next cam in the sequence. Thus as shown the cam at the right-hand end has two lobes, the next 4, the next 8, then 16, 32 and 64, respectively. The lobes provide for the actuation of corresponding switches 46, and it is this group of 7 switches which make up the RQS, providing for presetting a count into the recording sequence counter RQC corresponding to the particular position occupied by the carriage. The RQC is similar to the recording pulse counter RPC described in connection with Fig. 11, and in a similar manner thereto, generates one pulse per revolution of the system at a position determined by the setting of the 7 reset switches comprising the RQS. In other words, for every position of the carriage there is a particular pattern of the switches 46 of the RQS which identifies that particular carriage position and which in turn presets a definite count into the RQC.

Figure 12:
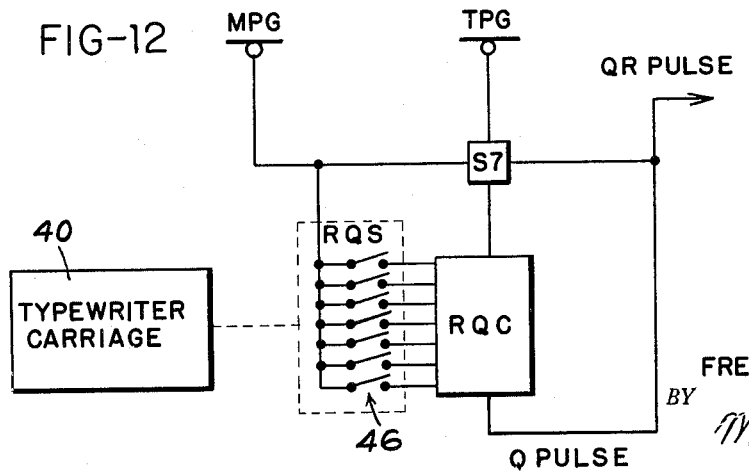
Fig. 12 is a diagram showing the portion of the circuit which operates in accordance with the position of the typewriter carriage for producing the QR pulse.

The operation will be described with reference to Fig. 12 in which electronic switch S7 is closed by the marker pulse and in so doing connects the TPG to the recording sequence counter RQC. Depending upon the position of the carriage, a count is preset into the RQC such that after a predetermined number of timing pulses have been counted, the RQC will reach its full count, return to zero and produce the zero pulse at the proper instant to select the cell which occupies the same relative position on the register drum as the carriage does in the line. The zero pulse from the RQC is called the sequence or Q pulse and will be so identified hereafter. Since it is produced in timed relation to the timing pulses, it will always occur at the beginning of a cell. To distinguish it from the Q pulse which is produced during the printing operation it is indicated in the drawings as QR or the recording Q pulse.

Figure 14:
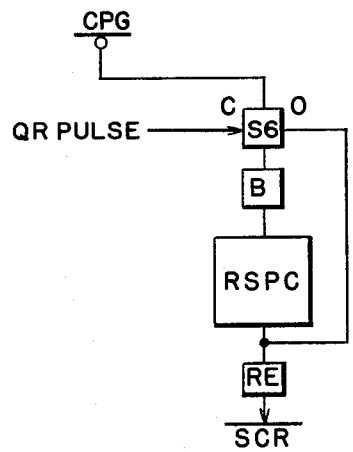
Fig. 14 is a diagram showing the portion of the circuit which provides for recording the data indicative of the width of the selected characters.

The method of recording the character and space data in each sequence cell is by means of a number code which corresponds to the character and to the number of space units that it occupies. Since the number of space units does not exceed 16 its recording is a simpler matter and therefore will be described first. Suppose that a character has just been selected as shown in Fig. 11 the space allotment of which is five space units and that five pulses from the SPG have been counted by the RSPC. In Fig. 14 is shown the electronic switch S6 which is closed by the QR pulse. To the input of switch S6 is connected the CPG and to its output through buffer B is connected the RSPC. The zero pulse output of the RSPC is connected to the opening circuit of switch S6 and to the recording head of the SCR. The RSPC is a four stage binary counter and normally produces a zero pulse whenever the total count reaches 16. Since the present count of the RSPC as above noted is five the RSPC will then produce a zero pulse after 11 more pulses have been counted. When switch S6 is closed by the QR pulse at the beginning of the sequence cell, pulses from the CPG are counted by the RSPC. It will be recalled that the CPG produces a group of 16 pulses for each cell and the result of the present operation will be that the RSPC will reach its zero count and will record a pulse on the SCR following the 11th pulse of the group of 16. It will thus be seen that any number from 1 to 16 may be represented by a single pulse recorded in one cell of the SCR, the number represented being determined by the position of the single SCR pulse relative to the limits of the cell in which it is recorded.

Figure 15:
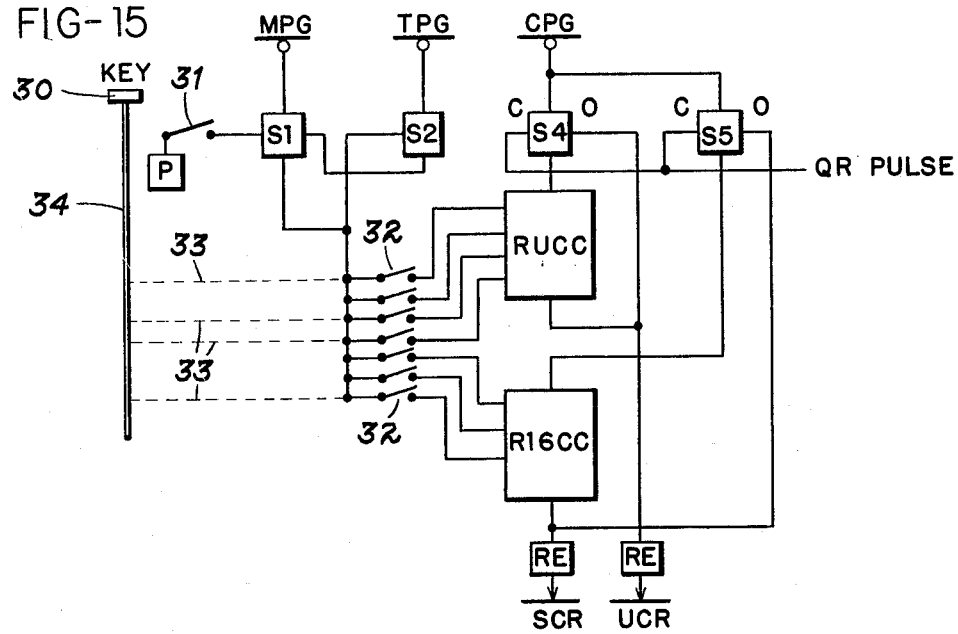
Fig. 15 is a view showing a portion of the circuit which provides for recording the data indicative of the selected characters themselves.

In Fig. 15 there is shown the control system for producing and recording data indicative of the particular character selected. The marker pulse generator MPG, electronic switch S1, the key, the selector mechanism 33 and the 7 preset switches 32 are identical to those shown in Fig. 11. The recording units code counter RUCC and the recording 16s code counter R16CC are shown. The RUCC is a 4-stage binary counter and as shown the first 4 preset switches are connected to the RUCC. The last three preset switches are connected to the R16CC, which is a 3-stage binary counter having a total count of 8. It will be recalled that under the description of Fig. 11 it was shown that when the key 30 was depressed the appropriate preset switches 32 were closed to cause the stages of the RPC to preset to a count corresponding to the position of the cell occupied by the space data for the selected character.

It has been shown previously how a cell of number 128−N may be selected by presetting the RPC to the number N. It will appear in subsequent description that if the switches 32 are actuated to set into the RPC a number N, the RUCC will be set to a number $j$ and the R16CC to a number $k$ such that $N=j+16k$, and that the number S of the cell selected during the operation of printing will be $S=j+16(k-1)$. In this relationship a binary value of $j$ of 0000 is taken to be 16, and a value of $k$ of 000 is taken to be 8, and neither quantity is ever taken as zero. As a consequence of this fact the character carrier 4 is so arranged that each character does not occupy the same cell as that occupied by its associated space data, but rather occupies a cell which corresponds in order to the relationship above expressed. Thus it will be seen in Figs. 3 and 10 that the groups of pulses shown in the vairous cells of the SPG do not correspond in number to the relative set widths of the characters occupying the same cells.

To take an example, suppose that the operator presses a key 30 corresponding to the upper case U, which occupies the 21st cell of the character carrier, so that $S=21$. From the above relationships it can be computed that $j=5$ and $k=2$, so that $N=37$. Therefore the space data associated with the upper case U will occupy the 91st cell, as established by the relationship 128−N. The binary equivalent of 37 is 0100101. Assuming that the switches 32 taken from top to bottom correspond in order to the binary digits as taken from right to left, and that a closed switch corresponds to a digit of 1, it will be seen that the selection of the upper case U will require that the first, third, and sixth switches be closed.

The first four switches being connected to the RUCC, that counter will be set to 0101, the binary equivalent of 5 ($j$) while the R16CC will be set to the binary equivalent of 2 ($k$) which is 010.

These two numbers are recorded on the RUCC and the R16CC by a method exactly like that described under Fig. 14 whereby the space code for the selected character was recorded. Electronic switches S4 and S5 are shown connected at their input circuits to the CPG. The output of switch S4 is connected to the input of the RUCC, and that of switch S5 is connected to the input of the R16CC. Both of these switches are closed by the QR pulse which it will be recalled occurs at the beginning of the cell corresponding to the position of the character in the line and which is therefore that cell on which it is desired to record in the various registers the code information appropriate to the selected character. Immediately following the closing of the switches the pulses from the CPG are counted into the respective counters simultaneously. When each counter has completed a total count of 16 it will generate a pulse which is transmitted to the recorder head and thereby recorded on the register associated therewith; at the same time that pulse opens the electronic switch connected to its input. Thus the RUCC which has been preset to a count of 5 will reach its full count on the 11th pulse of the group of 16 recorded on the CPG and will record on the UCR a pulse in that position. Similarly the R16CC which has been preset to a count of 1 will complete its count following the 7th pulse and will record on the 16CR a pulse in that position. It will be evident that both such pulses occur in the same cell on the respective tracks of the registers UCR and 16CR and are significant as to their value by reason of their location in the cell relative to the beginning and end of that cell.

Operation of the word space bar WS (Fig. 10) on the typewriter carriage closes switch 55 to establish a circuit from the static pulse generator P through buffer B to the closing circuit of switch S8 thereby closing switch S8. At the same time switch 56 has been closed by the word space bar, connecting the output of S8 to the WSR, so that the next QR pulse through S8 records a pulse on WSR, opens S8 and shifts the typewriter carriage by sending a pulse through escapement solenoid 43, allowing the typewriter to shift or advance one space in the normal manner. This QR pulse also closes switches S4, S5 and S6 for the process of character and space code recording previously described. The counters RUCC, R16CC and RSPC have all been left in the zero condition following their previous operation without any preset operations or space pulse counting such as take place during the recording of a character. Each code register pulse will therefore be recorded in the zero code position, corresponding to the last of the 16 pulses of the CPG group.

Having described in detail the processes whereby the individual pulses constituting the data for any one character are recorded on the several registers, it is now possible to refer to Fig. 10 and summarize the complete operation of character recording.

*Summary of recording operation*

Press character key, set RPC, RUCC and R16CC to character code simultaneously close S1
Marker pulse closes S7.
Marker pulse through S1 closes S2, connecting TPG to RPC.
Timing pulse through S2 opens S1, counts into RPC.
RPC reaches zero count, opens S2, closes S3 connecting SPG to RSPC.
Space pulses corresponding to selected character are counted from SPG into RSPC. First space pulse through S3 closes S8. Next timing pulse opens S3.
RQC counts 0, emits QR pulse which opens S7 (note: This sequence recurs each revolution, whether a key is depressed or not).
Next QR pulse through S8 shifts the typewriter carriage, closes S4, S5, and S6 connecting the CPG to the RUCC, the R16CC and the RSPC respectively.
CPG pulse through S6 opens S8.
During the ensuing cell pulses are recorded on the UCR, the 16CR and the SCR as previously described, opening switches S4, S5, and S6, leaving all counters at zero count and completing the process of data recording for one character. A similar single pulse is recorded in the WSR upon the occurrence of a word space.

Various fixed space keys are 60 (Fig. 10) provided which may be arranged to record fixed spaces of any length from 1 to 15 iotas. This is accomplished by suitable actuating switches 61 in coded relation to the actuated key to set the proper count into the RSPC. A word space may be of any length depending on the setting of the line, and is the only space subject to variation in the process of justification. Switch 62, also actuated by the space key 60, serves to transmit a pulse to the closing circuit of S3 to set in motion the data recording process previously described.

Figure 16:
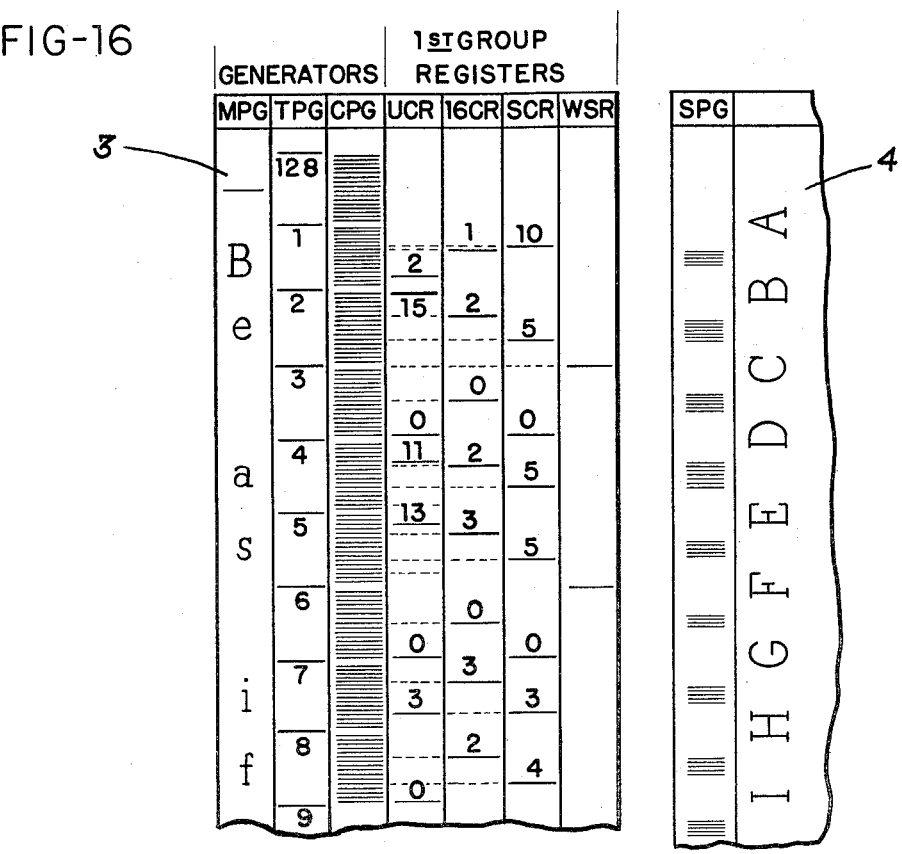
Fig. 16 is a developed diagrammatic view showing the recording of a portion of a typical line of composition on the recording drum.

There is shown in Fig. 16 a diagram of the recorded pulses in the first eight cells of the various registers as they would appear if the characters "Be as if" were to be recorded at the beginning of a line. It will be assumed that the characteristic codes for the characters and word spaces are as shown in the table forming part of Fig. 16. It will be seen from that table that in each instance a code number is recorded in a register cell in the form of a single pulse in each track distinguished by its position in the cell. That is, the pulse is approximately aligned with the pulse in the CPG corresponding in number to 16−N where N is the code number, except for the 16CR where its location will be 8−N as a result of the use of only 3 stages on the R16CC.

*Printing operation*

Figure 18:
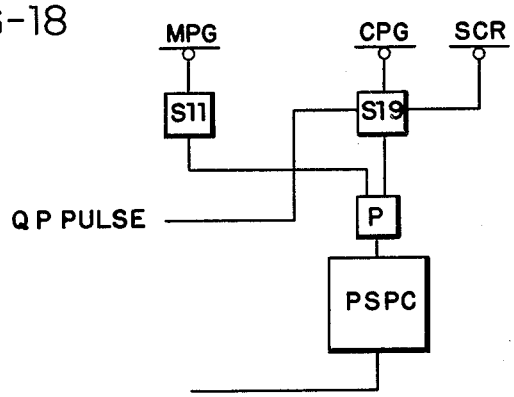
Fig. 18 is a schematic showing of the portion of the circuit controlling the printing space pulse counter.

The printing operation is illustrated in Fig. 17 and a detail thereof in Fig. 18. The magnetic pickup heads 6 used in the printing operation are similar to but entirely separate from those used in recording. As shown in Fig. 1 they are arranged in a fixed axial alignment with the register drum and in predetermined angularly spaced relation with respect to the recording heads 5. Similarly all counters, switches and other control elements used in printing are similar to but separate from those used during recording. It is thus possible for an operator to proceed immediately to record a second line on the second group of registers while the machine is printing the first line under control of the data recorded in the first group of registers. Suitable mechanism is provided for switching alternately from one group of registers to the other during both printing and recording.

Selection of successive cells of the register from which the data recorded therein is picked up to control the flashing of the characters and their proper spacing on the film is controlled by the printing sequence counter PQC which is a 7-stage binary counter similar to the RQC as described in connection with Fig. 12. It is preset by the printing sequence switch PQS in the same manner as the RQC is set by the RQS. Instead, however, of being controlled by the position of the typewriter carriage, the PQS is independent of the carriage position and is advanced in a step-by-step operation by means of a magnetically actuated shift mechanism such as that disclosed in said copending application, and the PQS thus steps forward one step for each character printed and presets the appropriate, progressively increasing, count into the PQC to enable the PQC to select the particular cells in proper sequence. This is accomplished by the marker pulse from the MPG closing switch S14 at the beginning of each revolution of the system after which timing pulses are counted from the TPG into counter PQC until the count reaches the maximum at which time it resets to zero and produces a sequence or Q pulse. This pulse is similar to but not the same as the QR pulse described above in the recording operation and for identification will be hereinafter referred to as the QP pulse. It is produced in timed relation with the timing pulses and hence always occurs at the beginning of a cell.

Fig. 18 shows the means whereby the space code recorded on the SCR is converted into space units in the printing operation and will serve in general to show how a recorded code number on any one of the registers is read in the printing operation. In Fig. 18 is shown the printing space pulse counter marked PSPC. To the input circuit of the PSPC are connected through buffer B the CPG through switch S19 and the MPG through switch S11 which is normally closed. The switch 19 is closed by the QP pulse, connecting the CPG to the PSPC which then counts pulses from the CPG until switch 19 is opened by the code pulse from the SCR. For example, assume a code count corresponding to a space allotment of five units for the particular character. As described in connection with Fig. 14 it was shown that under such conditions the code pulse recorded on the SCR would correspond with the 11th pulse of the group of 16 recorded on the CPG. The pulse so recorded on the SCR at the instant when it passes under its recording and pickup head 6 produces a pulse in the SCR circuit which is connected to the opening circuit of switch S19. Therefore under such conditions switch S19 will be opened by the code pulse from the SCR after a count of 11 has been registered by the PSPC. Meanwhile through switch S11 the PSPC has been counting one pulse for each revolution of the system from the MPG. Consequently the system continues through five revolutions at which time the total count on the PSPC will equal 16 and the PSPC will then emit a pulse which sets into action the operation of selecting the proper character for printing.

To summarize, if the selected character has a space code of $s$ units, the code pulse will be picked up after 16−$s$ pulses of the CPG group have occurred. When the code is read into the PSPC it will have counted 16−$s$ pulses from the CPG. After the system has rotated through $s$ turns, and counting $s$ pulses from the MPG into the PSPC, the count of the latter will total 16 and a pulse will be emitted.

The film is advanced continuously in direct relation to the rotation of the system and thus the film has also been advanced through $s$ space units as desired for the assumed character width of that amount. The direct correlation between the film advance and the rotation of the system is indicated diagrammatically at 7 in Fig. 1.

It has been shown above how the code pulses indicative of the particular character have been recorded on the UCR and 16CR, and how for that purpose the character code number N has been represented by the two code numbers $j$ and $k$ where $N=j+16k$. Without further detailed analysis, it will be understood that in the same manner and concurrently with the reading of the SCR into the PUCC and the P16CC, the recorded character selection code is read from the UCR through the switch S17 (Fig. 17) into the PUCC, which is a 4-stage counter, the PUCC will be left with a count of 16−$j$. The P16CC is a three stage counter and will be left with a count of 8−$k$ when the code is read into it from the 16CR through switch S18.

When the operator wishes the machine to proceed with the printing of a previously recorded line, he presses the Print Key (Fig. 17). This closes switches S11 and S15. The marker pulse through switch S11 counts 1 per revolution into the PSPC as above noted. The QP pulse through switch S15 closes switches S17, S18 and S19, thereby initiating the above described process of reading the character and space code numbers into the PUCC, P16CC and PSPC. The QP pulse also closes switch S22, which is opened by the next Timing Pulse, and opens switches S24, S25 and S26. S26 is reclosed by the next marker pulse. After the system has completed $s$ turns the emitted pulse from the PSPC, through switch S26 closes switches S16, S24 and S25. Since the PSPC reaches the zero count by counting a pulse from the MPG this will always occur at the datum line, following the marker pulse, and preceding Timing Pulse No. 1.

The pulses from the TPG are then counted into the PUCC, which having been previously left with a count of 16−$j$, will emit a pulse after $j$ pulses have been counted and every 16th pulse thereafter. The zero pulse from the PUCC is counted through switch S24 into the P16CC. Each 16 pulses thereafter the PUCC will emit another pulse. When the PUCC has emitted $k$ pulses the P16CC will reach its full count of 8 and will emit a zero pulse. Since the first pulse into the P16CC comes at a count of $j+0$, the $k$th pulse into the P16CC will come at a count of $j+16$ $(k-1)$. Thus is established the relationship expressed hereinbefore which governs the relative location on the character carrier 4 of the characters and their associated space data as related to the original code setting, N, of the switches 32, and it is consequently shown that the appearance of the output pulse from the P16CC will coincide precisely with the appearance of the selected character in alignment with the axis of the optical system 10 (Fig. 1) and the related flash light source 9.

The output pulse of the P16CC is transmitted through switch S25 to the flash unit, and there triggers the high intensity light flash, which thus flashes through the stencil of the selected character on the character carrier 4 at the precise instant that the character is in position, and its image is formed on the film carried in film carriage 8 in the correct position in the line. The flash unit is indicated only diagrammatically as any suitable unit may be used, such as that disclosed in said copending application. The same pulse through S25 opens S16 and causes the closing of S15 to initiate the reading of data for the next character.

Switch S26 is adapted to be opened whenever code register data is being read into the PSPC, which is accomplished by the QP pulse as transmitted through switch S15. Switch S26 is then reclosed by the next succeeding marker pulse through switch S11. This precaution is necessary to prevent the PSPC from emitting a pulse in the event a space code of zero is recorded (as is the case in the event of a word space) which will result in the counting of a full 16 pulses into the PSPC during the data reading operation. Switches S24 and S25 are also open during the time that the code is being read into the counters PUCC and P16CC, for the same reason.

*Word spacing and justifying*

The operation of the system will now be described with reference to the operations that take place upon the occurrence of a word space, i. e., any space between two groups of characters which space it is desired to cause to vary to accomplish the justification of the line, and in that connection the justifying operation will also be described.

It will be understood from the foregoing that a pulse has been recorded on the WSR for each word space in the same angular position as the QP pulse at the beginning of the cell corresponding to the position of the word space in the order of the line.

Following the printing of each character, switch S15 is closed as described above, permitting the next QP pulse to close switches S14, S15, S16 and S22, to read the code data on the registers as previously described. In the case of a character there is no pulse appearing on the WSR for that cell and switch S22 is opened by the next timing pulse. Whenever a word space pulse appears on the WSR it appears at switch S22, after a delay of about 1° of rotation caused by delay element D. This delay is required, since the word space pulse is coincident angularly with the QP pulse which closes switch S22. This pulse through switch S22 opens switch S11, suspending the normal spacing operations and its consequent printing sequence, and closing switch S12. Switch S22 is then opened by the next timing pulse which occurs at the end of the cell. In the meantime, switches S14, S15 and S16 are reading the zero code into the counters PUCC, P16CC and PSPC. This means that 16 pulses are read into each counter, returning it to its former count. This count is always zero in the case of the PUCC and P16CC. In the case of the PSPC the count may be either zero or 1, depending on whether or not the marker pulse has occurred following the last printing operation and prior to the appearance of the subsequent QP pulse through S15.

The next marker pulse through switch S12 closes switches S21 and S23. Switch S21 connects the SCR to the closing circuit of switch S20, which is opened by the timing pulse. Switch S20 connects the CPG to the input of the justifying counter JC. So long as switch S21 remains closed, each space code pulse on the SCR will close switch S20, and the following timing pulse will open it again. Since each space code pulse is so related to the permanently recorded group of 16 pulses for each cell on the CPG that for any space allotment $s$, $s$ pulses of the CPG group appear after the space code pulse, it follows that $s$ pulses from the CPG will be counted through S20 for each cell and the result will be that the space code allotment for each cell will be read into the JC in turn. During one revolution of the system, therefore, the JC will count the entire space allotment of all the characters in the line.

At the same time that is going on, the word space pulses from the WSR are being counted into the JC by way of switch S23. These two operations can proceed concurrently, since the word space pulses are substantially coincidental with the timing pulses, and the CPG, which generates the space code, has no recorded pulses coincidental with the timing pulses, so that there will be no overlapping or coincidental pulses in the two separate groups being read into the JC.

Figure 20:
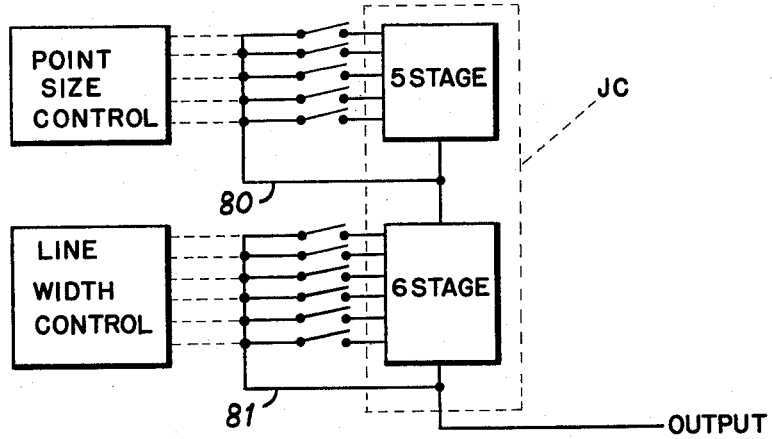
Fig. 20 is a diagrammatic view of the portion of the mechanism providing for control of the erasing function.

The JC is a binary electronic counter having sufficient counting capacity to count the maximum permissible iota length of any contemplated line. The counter has the usual reset switches which enable it to be reset to any desired count, similar to those described heretofore, and the resetting operation is performed by the zero pulse of the counter itself, as shown in Fig. 11 of said copending application and indicated diagrammatically at 80 and 81, Fig. 20 hereof. The result is that the counter can be caused to emit a zero pulse and reset itself after any predetermined number count, and so long as the preset switches remain unchanged, the zero pulse will be emitted each time that number has been counted.

The JC is arranged to reset after a number of counts which is equal to the length of the desired line in iota units. The means whereby this is controlled in terms of picas and point sizes will be described subsequently.

It has been described how, during one revolution of the system a count has been read into the JC equal to the total space count of all the recorded characters, plus one count for each word space. During this revolution the first word space pulse through switch S23 opens switch S12 and closes switch S13. At the end of this revolution the marker pulse through switch S13 opens switch S21, thus concluding the counting of character space units, and leaving the number of iotas counted at the exact total of all the characters and word spaces in the line.

At this point it will be seen that since the original setting of the JC was the total space allotment of the line, and the total character allotment plus one count for each word space has now been counted, the count yet to be made before the zero count pulse is reached is the space left for word spaces, less one count per word space.

Since switch S23 remains closed at this point, the counting of word spaces continues, counting one count per word space for each revolution of the system. The total of the line, less the total for the recorded characters is the total available for word spaces, and since the number of word spaces is counted once per revolution it will be seen that this process will continue until the number of times the word space count is repeated is equal to the number of space counts per word space. Stated more compactly this is to say:

$$\frac{L-C}{W}=A$$

where

L is the total iotas of the line,
C is the total iotas of the characters
W is the number of word spaces
A is the average iotas per word space.

Since it cannot be assumed that A is an integral number, it must be assumed that the JC will reach a zero count somewhere in the course of one revolution, and will thereupon reset for a new count.

When the JC resets it closes switches S11 and S15. The next marker pulse through switch S11 resumes the normal process of counting into the PSFC and opens switch S23, which concludes the counting of word space pulses into the JC. Since this counting continues until the end of the revolution in which the JC resets, the JC will continue to count during the remainder of the revolution, and will in general be left with a remainder count. This remainder remains in the JC until the next word space occurs so that the next reset will occur that much sooner in the cycle, with the result that certain of the word spaces will be 1 unit shorter than the first word space, while others are of equal length. However the remainders will not be bunched either at the beginning or end of the line but will be distributed in a regular pattern throughout the entire line. Since the number of word spaces W is counted A times per word space, the entire count for all word spaces will be $(WA+C)W$. Since $WA+C=L$, the total count for the line must therefore be WL. Since W is always an integral number, it will be seen that the count for the last word space in the line will always come out without a remainder, and that the justifying is therefore exact. A numerical example is given in said copending application.

In order to describe the means whereby the length of the typed line will be set by the machine operator in terms of linear measure, ordinarily picas, some discussion will be given of the spacing relationships with varying point sizes of type.

One of the great advantages of the photographic typesetting machine is its ability to reproduce varying sizes of type from the same font by interchanging lenses of various focal length in the projecting system. It is evident from the foregoing that at the same time lenses are changed to change the size of the character projected, the relationship between drum rotation and film translation should be changed correspondingly, and in said copending application means are described for accomplishing these two related changes from a single control. Because of the greater possible flexibility of the present type machine, many occasions will arise in its use when it may be desired to change these relationships independently of one another, and the description to follow is based on the assumption that in the present instance this may be done.

Let it be assumed that a given font of type, as represented by a character drum with characters and its associated SPG, is designed to have a ratio of 12 iotas per square space or em quad. When printing pica sized (12 point) type this means that there will be 12 iotas per pica, or 72 iotas per inch, and that the corresponding film translation drive will be geared to travel $\frac{1}{72}$ inch for each turn of the rotating system. If P be called the point size of type and I the number of iotas per pica it will be seen that $PI=144$ for this particular font, and that only certain sizes of type can be printed in lines of integral pica length measure, since the machine is adapted to space only in integral numbers of iotas. This gives a good range of choices of point size as expressed by $$P=\frac{144}{I}$$

where I is any integer. Even though corresponding lenses may not be provided for each of the possible point sizes provided by this relationship, much machine flexibility can be added by providing a large number of these ratios for film drive. The possible point sizes for such a font for values of I from 3 to 32 are shown in the following table:

TABLE I

| Point Size (P) | Iotas Per Pica (I) | Point Size (P) | Iotas Per Pica (I) |
|---|---|---|---|
| 72 | 2 | 8 | 18 |
| 48 | 3 | 7.59 | 19 |
| 36 | 4 | 7.2 | 20 |
| 28.8 | 5 | 6.84 | 21 |
| 24 | 6 | 6.54 | 22 |
| 20.56 | 7 | 6.26 | 23 |
| 18 | 8 | 6 | 24 |
| 16 | 9 | 5.76 | 25 |
| 14.4 | 10 | 5.54 | 26 |
| 13.09 | 11 | 5.33 | 27 |
| 12 | 12 | 5.14 | 28 |
| 11.08 | 13 | 4.96 | 29 |
| 10.28 | 14 | 4.8 | 30 |
| 9.6 | 15 | 4.64 | 31 |
| 9 | 16 | 4.5 | 32 |
| 8.48 | 17 | | |

It has been shown how the length of the line set by the machine is controlled by the setting of the JC in total iota count. For convenience of adjustment the JC is divided into two counters (Fig. 19), the first being a 5-stage binary counter that has reset switches governing a reset from its own zero pulse circuit as shown at 80 so that the counter may be made to reset itself after reading the zero count to any number count from zero to 15 inclusive. This being done, the counter may then be set to emit a zero pulse after a total count of from 1 to 32 pulses. The reset control for this counter is of construction similar to that of the Recording Sequence Switch shown in Fig. 13 and may be interlocked with the control which regulates the film drive ratio in such a way that the counter resets on a count equal to the value of I for that drive ratio. The output of the 5-stage input section of the JC will then be one pulse per pica if the input is one pulse per iota, as described above in connection with justifying.

The rest of the JC will then consist of a 6-stage counter which can be reset for any number of picas from 1 to 64, the control for which then constitutes a line width control calibrated in picas.

This arrangement makes it possible to print different point sizes in the same length of line, as well as to letter-space underset lines by printing at a larger value of I than standard, and to condense overset lines by printing at a smaller value of I.

Letter-spacing may also be accomplished during the recording cycle by causing the RSPC to reset at a count of $16-s$ where $s$ is the number of iotas desired to be added to the spacing of each character. It has been described how the space code is recorded by recording a pulse on the SCR when the count of the RSPC reaches a total of 16, and how the space allotment so recorded corresponds to the number of CPG pulses following the recorded space code pulse in any one cell. It may be seen, therefore that setting the RSPC to reset on a count a certain amount less than 16 will cause the code pulse to be recorded that much earlier, and the corresponding space allotment to be that amount greater for each character.

This may be simply accomplished by locking down the fixed space key 60 for the desired space increment and locking down the letter space key 65 (Fig. 10) which connects the reset circuit of the RSPC to its output.

Kerning and other non-standard spacing during normal recording may most easily be practiced by erasing the normally recorded space code for any character and replacing it by a fixed space of the desired value, the respective procedures for which have already been described.

Many kinds of tabular matter may be recorded by recording a set of space codes for a line and then tabulating the material on the typewriter, recording the character data for the successive lines but leaving the space code data as originally recorded. This may be done by suspending the normal processes of space code recording, and by erasing only the character data between recordings of lines. Recording and erasing of the SCR code may be suspended by disconnecting the SCR RE unit from the 400 volt power supply by means of a switch such as shown at 21 in Fig. 9. In this way any character that occupies a given space on the typewriter carriage will occupy a corresponding space on the projected line, since data recorded on any given cell will always occupy the same space on the projected line so long as the space code data remains unchanged.

*Selective erasing*

Erasing of the data recorded in any one cell is accomplished by the same head that is used for recording, as described in detail in the description of the Record-Erase unit. All data passing the head between the applications of pulses to the start and stop terminals of the unit will be erased as described in connection with Fig. 9.

For control of the erasing procedure, the registers are divided into two groups (Fig. 20), one comprising the UCR and 16CR, the other comprising the SCR and the WSR, each group being thus separately controllable. Three keys are provided for each group, only one group, that for erasing the UCR and the 16CR with their control circuits being shown, with all parts being duplicated for the other group. There is one key 90 to erase a single predetermined cell, a second key 91 to erase all cells following a given cell, the third key 92 to erase the whole line. In the first two instances the erasing operation begins at that cell at which the typewriter carriage has been set and hence is connected to be controlled by the QR pulse.

These operations are controlled by connecting the "Start" and "Stop" connections of the Erase Unit (Fig. 19) as follows:

Erase one cell—"Start" connected to QR pulse, "Stop" connected to Timing Pulse. Erase line remainder— "Start" connected to QR pulse, "Stop" connected to marker pulse. Erase entire line—"Start" connected to Timing Pulse, "Stop" connected to marker pulse.

It will be apparent that since the position of the sequence pulse QR is determined by the position of the typewriter carriage, when the erasing procedure is started by the QR pulse the erasure will begin at that character at which the carriage is set, and will be limited to that one character or continue to the end of the line, as the operator may choose.

*Indication of amount of line set*

It is desirable to show the operator of the machine the extent to which he has set his line in composing, the typewriter being an unreliable source of such information because of its lack of variable character spacing.

In Fig. 21 is shown a system for indicating on a meter dial the total space allotment of characters and word spaces as they are recorded during composition. It will be apparent that a relay operating a suitable alarm such as a bell or light may be substituted for the meter shown. The tube 101 having in its plate circuit resistance 102 and meter 103 is normally biased beyond cutoff and draws no plate current. Buffer tube 104 is connected to actuate the grid of tube 101 positively either through the action of tubes 105 or 106. The cathode of tube 101 is biased about 80 volts negative so that when the grid of tube 101 is actuated positively the tube draws enough plate current to bring its plate potential down to that of ground, and to draw part of its plate current through diode 107. Diode 107 has a relatively low resistance and prevents the plate of tube 101 from becoming substantially negative with respect to ground, so that under such conditions the potential across resistance 102 and meter 103 is substantially constant and independent of the exact plate current of tube 101.

Tube 105 is an unbalanced flip-flop circuit whose normal state will be such that the grid connected to buffer 104 is in the more negative state, which will be called the Off state. The normally positive grid of tube 105 is connected through rectifier 107 to the output of electronic switch S108. The input of this switch is connected to the CPG and it is closed by the SCR pulse and opened by the timing pulse so that its output produces the number of pulses corresponding to the space allotment of the various characters, as recorded in the various cells of the SCR (see description of justifying). These pulses are rectified by rectifier 107 and negative potential is impressed on the grid of tube 105 so that so long as pulses are appearing in the output of switch 108 tube 105 remains in the On state, being prevented from returning to its normal state between the closely spaced CPG pulses by the condenser 110, whose time constant in combination with resistor 109 is longer than the interval between pulses.

Thus the proportion of On and Off time of flip-flop tube 105 will bear a direct relation to the total iotas of character space recorded in all the cells of the SCR.

Tube 106 functions as a so-called univibrator, or one-shot multivibrator. Normally in the Off state it will shift to the On state in response to a pulse impressed on its input circuit and remain in that state for a period depending on the value of the time constant of condenser 111 with resistors 112 and 113. This period is adjusted to be equal to the duration of the number of CPG pulses corresponding to the desired iota length of each word space, commonly an en quad, or 6 iotas in the example given.

Univibrator 106 will be shifted to the On state by each word space pulse by means of the connection between its input and the WSR pickup so that its proportion of On time will bear a direct relationship to the total iotas of word spaces coded in the WSR.

Figure 22:
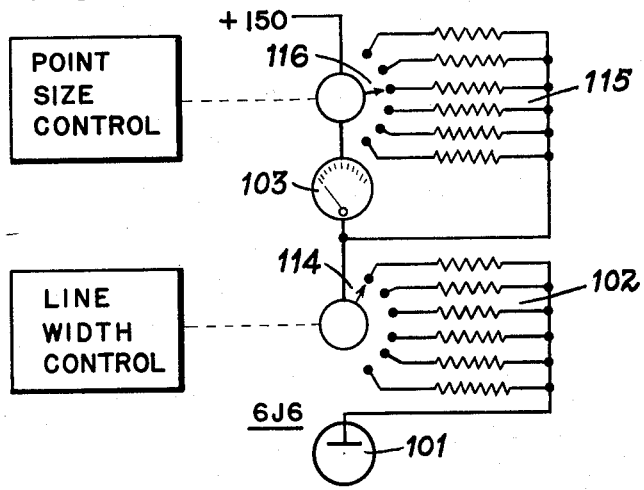
Fig. 22 is a diagram of a portion of the circuit of Fig. 21.

Tube 101 draws current when either tube 105 or tube 106 is in the On state, and since no character space data is recorded in the same cell as a word space, tubes 105 and 106 will not be in the On state simultaneously. Therefore the average current in meter 103 will be proportionate to the sum of the iotas of character space and word space, and by suitable adjustment of resistance 102 and meter 103 as described below, meter 103 can be made to indicate the percentage of set in the line being composed. The resistor 102 and meter 103 may advantageously be adjusted by controls which are mechanically interlocked with the controls which set up the JC counter. A suitable circuit is shown in Fig. 22. The resistor 102 is shown to consist of a group of preset values any one of which is selected in accordance with the setting of the switch 114, which may be operated from the same control as the line width control shown in Fig. 19.

Figure 19:
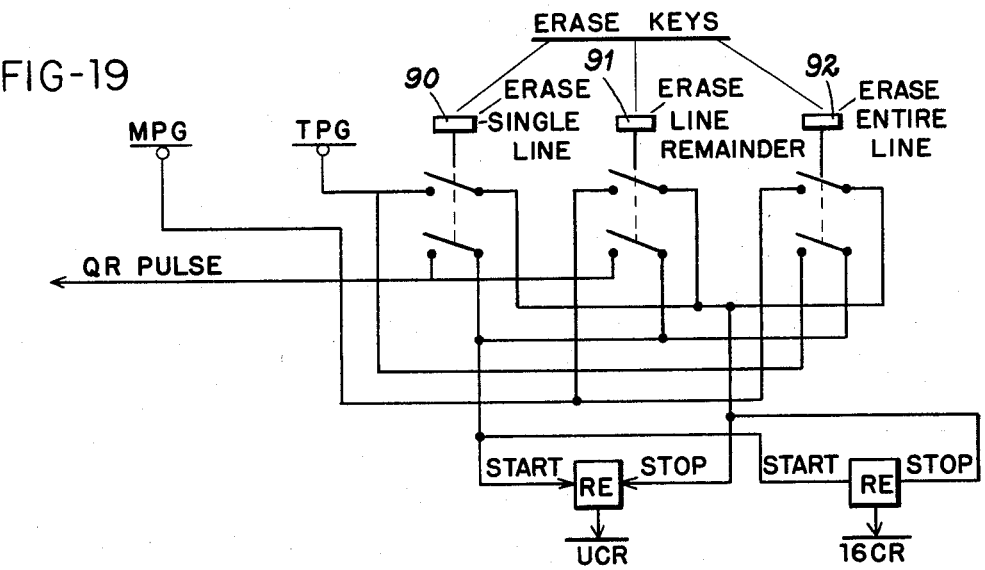
Fig. 19 is a view showing the justifying counter incorporating two separate counter stages for selective control of the point sizes and line length.

Similarly, resistance 115, which is a shunt across meter 103, may be selected by switch 116 in accordance with the setting of the point size control shown in Fig. 19.

It has been shown that the potential impressed across meter 103 and resistance 102 is always the same during the periods of conductance of tube 101, and this potential will approximate 150 volts in the circuit shown in Fig. 21. It has also been shown how the average ratio between time On and time Off will bear a fixed relation to the spacing allotment for the line, so that the average potential E may be said to be a function of the width in iotas of the line as set, assuming a standard en quad for each word space or, $$E = ki \text{ from which } i = \frac{E}{K}$$

If the desired line width in iotas be L, then L will be the product of the width in picas $p$ multiplied by the film drive setting I (or iotas per pica)

$$L = pI$$

The current $c$ through meter 103 will be $$c = \frac{E}{fR}$$

where R is the value of resistor 102, and $f$ is a factor depending on the value of resistor 115 compared with the resistance of the meter coil, assuming the latter to be small compared with R. The current through meter 103 at full scale reading may be called C. It is then desired that $$\frac{c}{C} = \frac{i}{L}$$

which is to say that the meter reads the proportion of the total available width already set from which $$\frac{E}{fRC} = \frac{E}{kpI}$$

whence $$fRC = kpI$$

so that $$\frac{fR}{Ip} = \frac{k}{C}$$

which is a constant.

It is therefore clear that if $f$ is adjusted by means of switch 116, which is a function of I, and R is adjusted by switch 114, which is a function of $p$, the meter will then indicate the proportion of line set.

The exact values of R and $f$ for any given machine will depend on the following factors: The exact number of code pulses per cell and their spacing relative to the timing pulses, the value of the meter current for full scale reading (C), and the chosen calibrations of the $p$ and L controls. Such values are best established therefore by trial of the actual machine.

*Summary of advantages*

The justifying system herein described is unique in its ability to produce spaces of any size in order to fill the line, as distinct from previously described systems of justifying which are capable of varying only a portion of the available space within limits. As extreme examples, if the operator of the machine records a line consisting of a single character A, then a word space, and finally another character B, the machine will print the A at the left hand margin and the B in proper alignment at the right hand margin. If the operator records a line consisting of a word space, a single character A, and another word space, the machine will print the A precisely in the center of the line.

It is possible to take advantage of this characteristic to solve many common problems in composition without having to depart in any way from the routine methods used in composing straight text. For example in printing such matter as telephone directories, it is desired to compose such as:

NAME AND ADDRESS       TELEPHONE NUMBER where the name and address is aligned at the left-hand margin with the number aligned at the right-hand margin. The operator can record this line by simply using fixed spaces between words except for that space between the address and the telephone number at which point a word space is recorded, and the machine will then adjust this one space to fill the line. Similarly in composing title pages, invitations, menus, and many other types of matter, it is desired to center the printed matter such as:

THE FOLLOWING IS
AN EXAMPLE
OF
PRINTED MATTER
CENTERED ON THE PAGE

The operator will record a word space before and after each line, using fixed spaces between words and the machine will center the printed matter precisely.

No difficulty will be presented by the problem of recording multiple columns of justified matter, and the operator may compose these lines by composing one column at a time, then rewinding the film to begin the next column with a different margin setting, or he may change the margin by recording fixed spaces and record the desired number of lines horizontally across his page before leading for the next line.

Tabulating material may be accomplished by using fixed spaces, as described hereinbefore, which will be especially suitable with numerical matter, or by the methods used in composing multiple columns.

This machine has been represented as carrying but one character disk with recorded characters and space pulses. It will be understood that this disk may be arranged to be easily removed and replaced by another for the purpose of printing from different fonts of type. It will be also recognized by those skilled in the art that several disks may be carried on the machine at one time, with provision to bring any one of these disks into operation as desired.

Because of the great possible flexibility of this machine in dealing with widely differing designs of character, it is advantageous to place only one font of type on a single disk so that each user of the machine may make his own choice of type faces and will thus be enabled to acquire at low cost those fonts of his choice.

By virtue of the possible division of the character width into 16 discrete units, and the fact that each type font carries its own space pulses there is no limitation to the variations of character design that may be printed by the machine. It should also be noted that the space units as measured by the machine are in terms of type sizes, and bear a constant relation to the specified character widths no matter what size is being printed by the machine. This means that the type spacings as printed will always bear the same proportions to one another regardless of the size of the type being printed. At the same time it is possible for the operator to vary the spacing relationships independently of the point size whenever it may be desired, as has been described.

For these reasons this macihne is not only adapted to the rapid composition of ordinary text matter but equally adapted to the production of the highest grade of typography.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a photocomposing machine the combination of means for selecting characters and word spaces to form a line of composition, a continuously rotatable character carrier having characters of different width located in different angular positions thereon, coded data on said carrier associated with each of said characters indicative of the width thereof, a register continuously rotatable in coordinated relation with said character carrier and having a series of zones in angularly spaced positions thereon, said zones having a plurality of recording tracks, means controlled by said character and word space selecting means for selecting a sequence of zones on said register corresponding to the positions of selected characters in said line of composition, means for recording in said zones on certain tracks thereof coded data identifying the selected characters, and means for recording on another track of the same zones of said register a corresponding sequence of coded data indicative of the width of said selected characters.

2. In a photocomposing apparatus for producing a line of composition photographically, the combination of a continuously rotatable system including as parts thereof a character carrier and a register, said register having a plurality of zones distributed around the periphery thereof each of predetermined angular extent, said character carrier having a series of characters spaced thereon arranged in a predetermined order and with the same angular spacing as said zones, means for selecting characters to form said line of composition, means for selecting zones on said register in sequence corresponding to the arrangement of successive characters in the line of composition, recording heads relatively fixed with respect to the axis of said register for recording coded data in said zones during continuous rotation of said system, and means including said fixed heads for recording in a selected position within each said selected zone coded data identifying the corresponding selected character.

3. In a photocomposing apparatus having a typewriter with a traveling carriage and adapted to produce a line of composition photographically, the combination of a continuously rotatable system including as parts thereof a character carrier and a register, said register having a plurality of zones distributed around the periphery thereof each of predetermined angular extent, said character carrier having a series of characters spaced thereon in predetermined order with the angular spacing thereof corresponding to that of said zones, means controlled by the travel of said carriage for selecting zones on said register in sequence corresponding to the arrangement of successive characters in the line of composition, means controlled by the actuation of said typewriter for selecting characters to form said line of composition means for recording in each of said zones in a selected position relative to the boundaries of that zone coded data identifying the selected character, and pickup means associated with said register for reading said coded data and responsive thereto for controlling the selection of characters in reproducing said line of composition.

4. In a photocomposing apparatus having a typewriter with a traveling carriage and adapted to produce a line of composition photographically on a film, the combination of a continuously rotatable system including as parts thereof a character carrier and a register, said register having a plurality of zones distributed around the periphery thereof each of predetermined angular extent, said character carrier having a series of characters spaced thereon with the angular spacing thereof corresponding to that of said zones, means controlled by the travel of said carriage for selecting zones on said register in sequence corresponding to the arrangement of successive characters in the line of composition, means controlled by the actuation of said typewriter for selecting characters to form said line of composition, means for recording in each zone in a selected position relative to the boundaries of that zone coded data identifying the selected character, a flash source of light associated with said character carrier, pickup means associated with said register and responsive to the data recorded in said zones, and means controlled by said pickup means for controlling said light source to effect the flash illumination of the characters on said character carrier in the proper timing to produce an image of said line of composition on said film.

5. In a photocomposing apparatus having a typewriter with a traveling carriage and adapted to produce a line of composition photographically, the combination of a continuously rotatable system including as parts thereof a character carrier and a register, said register having a plurality of zones distributed around the periphery thereof each of predetermined angular extent, said zones having a plurality of recording tracks said character carrier having a series of characters spaced thereon with the angular spacing thereof corresponding to that of said zones, coded data associated with each of said characters indicative of the width thereof, means controlled by the travel of said carriage for selecting zones on said register in sequence corresponding to the arrangement of successive characters in the line of composition, means controlled by said typewriter for selecting characters to form said line of composition, means for recording on certain tracks of said zones coded data identifying each selected character, and additional means associated with said register for recording data on another track of the same zones indicative of the widths of each of the selected characters.

6. In a photocomposing apparatus having a typewriter with a traveling carriage and adapted to produce a line of composition photographically, the combination of a continuously rotatable system including as parts thereof a character carrier and a register, said register having a plurality of zones distributed around the periphery thereof each of predetermined angular extent, said character carrier having a series of characters spaced thereon with the angular spacing thereof corresponding to that of said zones, coded data associated with each of said characters indicative of the width thereof, means controlled by the travel of said carriage for selecting zones on said register in sequence corresponding to the arrangement of successive characters in the line of composition, means controlled by said typewriter for selecting characters to form said line of composition, a magnetic recording and erasing head associated with said register, means for actuating said head for recording in each said zone coded data identifying each selected character, and means also controlled by the travel of said typewriter carriage for selectively actuating said head for erasing the data recorded in a particular zone corresponding to the position occupied by said carriage.

7. In a photocomposing apparatus for producing a line of composition photographically and having means for selecting characters to form said line of composition, a continuously rotatable character carrier, a register continuously rotatable with said character carrier and having a plurality of zones around the periphery thereof each of predetermined angular extent, means controlled by the sequence of characters in the line of composition for selecting a corresponding sequence of zones within said register, and means controlled in accordance with the selection of each individual character for recording in each of said selected zones coded data which is distinctive of the selected character by reason of its position in the zone.

8. In a photocomposing apparatus for producing a line of composition photographically on a film and having means for selecting characters to form said line of composition, a continuously rotatable character carrier, a register continuously rotatable with said character carrier and having a plurality of magnetically receptive recording zones around the periphery thereof each of predetermined angular extent, each said zone including a plurality of parallel tracks means controlled by the sequence of characters in the line of composition for selecting a corresponding sequence of zones within said register, means for recording in the first said zone a single magnetic pulse at positions on said plurality of tracks identifying that particular character, said last mentioned means incorporating a two position number code, and means controlled in accordance with the selection of each successive character for recording similar data identifying that character in each of said series of successive zones.

9. In a photocomposing apparatus for producing a line of composition photographically on a film and having means for selecting characters to form said line of composition, a continuously rotatable character carrier, a register continuously rotatable with said character carrier and having a plurality of magnetically receptive recording zones around the periphery thereof each of predetermined angular extent and including a plurality of parallel axially spaced tracks, means controlled by the sequence of characters in the line of composition for selecting a corresponding sequence of zones within said register, a plurality of magnetic recording heads in fixed axial relation to said register adapted for individual pulse recording in said tracks on said register, said zones extending across a plurality of said tracks, means including a said recording head for recording in one track of said zones a code pulse indicative of the width of the selected character, and means including others of said recording heads for recording in others of said tracks of the same zones code pulses identifying the character itself.

10. In a photocomposing apparatus for producing a line of composition photographically and having means for selecting characters to form said line of composition, the combination of a continuously rotatable register having a plurality of zones distributed around the periphery thereof each of predetermined angular extent, a character carrier continuously rotatable with said register and having characters thereon of different width located in different angular positions thereon corresponding to the angular spacing of said zones, means associated with said character carrier providing data indicative of the width of each said character, means controlled by said character selection means for recording in said zones in the same sequence data identifying each successive character, and additional means controlled by said character selection means for sensing said width data of each selected character and for recording said data in corresponding sequence in the same said zones.

11. In a photocomposing machine for producing photographically a line of composition on a film and having means for selecting characters to form said line of composition, the combination of a continuously rotatable character carrier having character images thereon in predetermined coded sequence in separate zone positions each of definite angular extent and capable of being photographically reproduced upon the film, a register continuously rotatable with said character carrier and having a corresponding series of zones arranged around the periphery thereof, means controlled by the position of the selected characters in the line for selecting a sequence of zones of said register to receive recorded data, and means controlled by said character selection means for recording in each zone of the selected sequence of zones of said register coded data corresponding to the position of said character on said carrier and identifying the selected characters.

12. In a photocomposing machine for producing photographically a line of composition on a film and having means for selecting characters to form said line of composition, the combination of a continuously rotatable character carrier having character images thereon in predetermined coded sequence in separate zone positions each of definite angular extent and capable of being photographically reproduced upon the film, means also associated with said character carrier in the form of coded data corresponding with each character thereon and indicative of the width of that character, a register continuously rotatable with said character carrier and having a corresponding series of zones arranged around the periphery thereof, means controlled by the position of the selected character in the line for selecting a sequence of zones of said register to receive recorded data, means controlled by said character selection means for recording in each zone of the selected sequence of zones of said register coded data corresponding to the position of said character on said carrier and identifying the selected characters, and additional means for recording in the same successive zones of said register data indicative of the widths of the corresponding characters.

13. In a photocomposing apparatus for producing a line of composition photographically on a film and having means for selecting characters to form said line of composition, a continuously rotatable character carrier, a register continuously rotatable with said character carrier and having a plurality of zones around the periphery thereof each of predetermined angular extent, said register having a plurality of tracks thereon, certain of said tracks having a pattern of permanently recorded pulses herein adapted to act as generators and others of said tracks being adapted for temporary recording of pulses in the respective zones thereof, means controlled by the sequence of characters selected in the line of composition for selecting a sequence of zones within said register, and means controlled by said character selection means for utilizing said permanently recorded pulses for temporarily recording in the others of said tracks data identifying the selected character.

14. The combination as defined in claim 13 in which said pattern of permanently recorded pulses includes a marker pulse identifying a datum line position, and a series of timing pulses marking the limits of each zone.

15. The combination as defined in claim 13 in which said pattern of permanently recorded pulses includes a marker pulse identifying a datum line position, a series of timing pulses marking the limits of each zone, and a code group comprising a predetermined number of pulses associated with each of said characters.

16. In a photocomposing apparatus for producing a line of composition photographically on a film and having means for selecting characters to form said line of composition, a continuously rotatable character carrier with the carriers arranged thereon in predetermined order and identifiable by a code pattern of pulses, a register continuously rotatable with said character carrier and having a plurality of zones around the periphery thereof each of predetermined angular extent, each of the zones of said register having a plurality of tracks thereon, certain of said tracks having a pattern of permanently recorded pulses therein adapted to act as generators and others of said tracks being adapted for temporary recording of pulses in the respective zones thereof, means controlled by the sequence of characters selected in the line of composition for selecting a sequence of zones within said register, and means actuated by said character selection means for temporarily recording in predetermined positions within other tracks of the same zones coded pulse data derived from said permanently recorded pulses and identifying the selected character.

17. In a photocomposing machine for producing a line of composition photographically on a film and having means for selecting characters to form said line of composition, the combination of a continuously rotatable system including a character carrier having characters arranged thereon in positions represented by a pattern of coded pulses, a register, and a plurality of pulse generators including a code pulse generator, said register and said pulse generators having a plurality of zones distributed around the periphery thereof each of predetermined angular extent, means controlled by the selection of characters in the line of composition for selecting a sequence of zones within said register, and means controlled by said code pulse generator for recording sequentially in each zone of said register data in the form of code pulses identifying the selected characters in said line of composition.

18. The combination as defined in claim 17 in which said generators include a first generator for producing a single marker pulse identifying a datum line position of the rotating system, and a second generator for generating pulses marking the limits of each of said zones.

19. The combination as defined in claim 17 in which said generators include a first generator for producing a single marker pulse identifying a datum line position of the rotating system, a second generator for generating pulses marking the limits of each of said zones, and a third generator forming said code pulse generator and having a predetermined uniform number of pulses in each zone position thereof.

20. In a photocomposing apparatus for producing a line of composition photographically on a film and having means for selecting characters to form said line of composition, the combination of a continuously rotatable character carrier having character images thereon in separate zone positions each of definite angular extent and capable of being photographically reproduced upon the film, said characters being arranged on said carrier in an order represented by a pattern of code pulses, a continuously rotatable register and a continuously rotatable pulse generator each rotatable with said character carrier and having a corresponding series of zones arranged around the periphery thereof, carrier corresponding to the selected character, means controlled by the position of the character in the line for selecting a sequence of the zones of said register to receive recorded data, and means controlled by said character selection means for causing said pulse generator to record in the selected sequence of zones of said register coded pulse data identifying the selected characters.

21. In a photocomposing machine for producing a line of composition photographically on a film, the combination of a continuously rotatable character carrier having character images thereon of different widths adapted to be photographically reproduced upon said film, a continuously rotatable magnetic system rotatable with said character carrier and angularly divided into a plurality of zones, said magnetic system having a recording track and another track with magnetic pulses recorded thereon, a magnetic pickup coacting with said recorded pulses to constitute a pulse generator, a counter having an input circuit connected to said pulse generator, means for presetting a predetermined initial count into said counter, means for selecting a sequence of characters to form a line of composition, means controlled by said character selecting means for correspondingly adjusting said presetting means, and means controlled by said counter for recording character identifying data on selected zones of said recording track of said magnetic system.

22. In a photocomposing machine for producing a line of composition photographically on a film, the combination of a continuously rotatable character carrier having character images thereon of different widths adapted to be photographically reproduced upon said film, a continuously rotatable magnetic system rotatable with said character carrier and angularly divided into a plurality of zones, said magnetic system having a recording track and another track with magnetic pulses recorded thereon, a pickup coacting with said recorded pulses to constitute a pulse generator, a counter having an input circuit connected to said pulse generator, means for presetting a predetermined initial count into said counter, means for selecting a sequence of characters to form a line of composition, means controlled by said character selecting means for adjusting said presetting means, an output circuit for said counter adapted to produce a characteristic pulse pattern upon said counter reaching a predetermined count, and means for recording said characteristic pulse pattern on said recording track of each of the selected zones of said magnetic system.

23. In a photocomposing machine for producing a line of composition photographically on a film, the combination of a continuously rotatable character carrier having character images thereon of different widths adapted to be photographically reproduced upon said film, data associated with said carrier indicative of the widths of each of said characters, means for selecting a sequence of characters and word spaces to form a line of composition, a magnetic system continuously rotatable in synchronous relation with said character carrier, said magnetic system being angularly divided into a plurality of zones, recording means associated with said magnetic system to form a register for recording data indicative of the selected characters and of the space data associated therewith, a counter for counting the zones of said register, means for presetting said counter to a predetermined count to select a particular zone of said register, means for actuating said presetting means selectively in accordance with each of the characters selected in said line, and means controlled by said counter for rendering said recording means operative within the limits of a single zone of said system for recording therein data indicative of a selected character and its associated space data.

24. In a photocomposing machine for producing a line of composition photographically on a film, the combination of a continuously rotatable character carrier having character images thereon of different widths adapted to be photographically reproduced upon said film, data associated with said carrier indicative of the widths of each of said characters, means for selecting a sequence of characters and word spaces to form a line of composition, a magnetic system continuously rotatable in synchronous relation with said character carrier, said magnetic system being angularly divided into a plurality of zones, recording means associated with said magnetic system to form a register for recording data indicative of the selected characters and of the space data associated therewith, a counter for counting the zones of said register, means establishing a datum line position on said register, means for presetting said counter to a predetermined count to select a zone having a particular relation to said datum line, means for actuating said presetting means selectively in accordance with each of the characters selected in said line, and means controlled by said counter for rendering said recording means operative within the limits of a single zone of said system for recording therein data indicative of a selected character and its associated space data.

25. In a photocomposing machine for producing a line of composition photographically on a film, the combination of a rotatable system having an axis of rotation and a datum line, a magnetic system forming part of said rotating system and having a plurality of tracks concentric with said axis, a magnetic pole located on one of said tracks establishing said datum line, a marker pulse generator pickup coacting with said magnetic pole constituting a marker pulse generator, a series of additional magnetic poles angularly disposed about a second of said tracks, a timing pulse generator pickup coacting with said series of additional poles to constitute a timing pulse generator, a character carrier forming part of said rotatable system and having thereon character images angularly disposed about said axis in positions corresponding to said series of additional magnetic poles, a switch connected to said timing pulse generator having a closing circuit connected to said marker pulse generator, a counter connected to said switch, means for presetting a predetermined count into said counter, means controlled by the selection of each character to selectively actuate said presetting means, a flash source of illumination for illuminating the individual characters on said carrier, a control circuit for actuating said flash source of illumination, and means connecting said control circuit to said counter for timed actuation thereof to select a predetermined character for projection onto said film.

26. In a photocomposing machine for producing a line of composition photographically on a film, the combination of a rotatable system having an axis of rotation and a datum line, a magnetic system forming part of said rotating system and having a plurality of tracks concentric with said axis, a magnetic pole located on one of said tracks establishing said datum line, a marker pulse generator pickup coacting with said magnetic pole constituting a marker pulse generator, a series of additional magnetic poles angularly disposed about a second of said tracks, a timing pulse generator pickup coacting with said series of additional poles to constitute a timing pulse generator, a character carrier forming part of said rotatable system and having thereon character images angularly disposed about said axis in positions corresponding to said series of additional magnetic poles, a switch connected to said timing pulse generator having a closing circuit connected to said marker pulse generator, a counter connected to said switch, means for presetting a predetermined count into said counter, means controlled by the selection of each character to selectively actuate said presetting means to receive data indicative of the sequence of the characters forming said line of composition, recording means related to a third of said tracks, a second switch means connected to said recording means, a closing circuit for said second switch means connected to said counter, and an opening circuit for said second switch means connected to said timing pulse generator for recording on selected zones of said third track data indicative of the characters in said line of composition.

27. In a photocomposing machine for producing a line of composition photographically on a film, the combination of a rotatable system having an axis of rotation and a datum line, a magnetic system forming part of said rotating system and having a plurality of tracks concentric with said axis, a magnetic pole located on one of said tracks establishing said datum line, a marker pulse generator pickup coacting with said magnetic pole constituting a marker pulse generator, a series of additional magnetic poles angularly disposed about a second of said tracks, a timing pulse generator pickup coacting with said series of additional poles to constitute a timing pulse generator, a character carrier forming part of said rotatable system and having thereon character images angularly disposed about said axis in positions corresponding to said series of additional magnetic poles, a switch connected to said timing pulse generator having a closing circuit connected to said marker pulse generator, a counter connected to said switch, means for presetting a predetermined count into said counter, means controlled by the selection of each character to selectively actuate said presetting means to receive data indicative of the sequence of the characters forming said line of composition, recording means related to a third of said tracks, operating means for rendering said recording means operative, and means connecting said operating means to said counter for recording on selected zones of said third track data indicative of the set width of the characters of said line of composition.

28. In a photocomposing machine for producing a line of composition photographically on a film, the combination of a continuously rotatable system including a character carrier having character images thereon adapted to be photographically reproduced upon said film, means for selecting a sequence of characters to form a line of composition, a magnetic system forming part of said rotatable system and including a pulse generator, a counter adapted to be actuated in accordance with the pulses produced by said pulse generator, said counter having an input circuit and an output circuit adapted to emit one pulse for each predetermined number of pulses supplied to said input circuit, selective control means for varying said predetermined number, means controlled by said character selecting means for actuating said selective control means, and magnetic recording means cooperating with said magnetic system for recording in predetermined coded relation thereon the pulse emitted by said output circuit to form a record on said magnetic system identifying each of said characters in the line of composition.

29. In a photocomposing machine for producing a line of composition photographically on a film, the combination of a continuously rotatable system including a character carrier having character images thereon adapted to be photographically reproduced upon said film, means for selecting a sequence of characters to form a line of composition, a magnetic system forming part of said rotatable system and including a pulse generator, means dividing said magnetic system into a plurality of separate circumferentially related individual zones, pulse counter means adapted to be actuated in accordance with the pulses produced by said pulse generator, said counter means having an input circuit and an output circuit adapted to emit a pulse pattern after a predetermined number of pulses have been supplied to said input circuit, selective control means for varying said predetermined number, means controlled by said character selecting means for actuating said selective control means, and magnetic recording means cooperating with said magnetic system for recording in a predetermined coded position within a selected zone the pulse pattern emitted by said output circuit to identify the particular character in the line of composition.

30. In a photocomposing machine for producing a line of composition photographically on a film, the combination of a continuously rotatable system including a character carrier having character images thereon adapted to be photographically reproduced upon said film, means for selecting a sequence of characters to form a line of composition, a magnetic system forming part of said rotatable system and including a pulse generator, means dividing said magnetic system into a plurality of separate circumferentially related individual zones, pulse counter means adapted to be actuated in accordance with the pulses produced by said pulse generator, said counter means having an input circuit and an output circuit adapted to emit a pulse pattern after a predetermined number of pulses have been supplied to said input circuit, selective control means for varying said predetermined number, means controlled by said character selecting means for actuating said selective control means, recording means cooperating with said magnetic system for recording in a predetermined coded position within a selected zone the pulse pattern emitted by said output circuit to identify the particular character in the line of composition, and means also controlled by said character selecting means for selecting said zones for receiving said pulses in a sequence corresponding to the sequence of the characters in the line of composition.

31. In a photocomposing machine for producing a line of composition photographically on a film and having means for selecting characters to form said line of composition, the combination of a continuously rotatable system including as parts thereof a character carrier and a register, said character carrier having a series of characters spaced thereon adapted to be photographically reproduced to produce an image thereof upon said film and having coded data associated with each of said characters indicative of the width thereof, said register having a plurality of zones distributed around the periphery thereof of predetermined angular extent, separate means for magnetically recording in selected zones of said register in sequence data indicative respectively of the selected character and of the width of that character, means for magnetically erasing the data recorded in said zones, and means for selectively actuating said erasing means to erase from a selected zone either the data indicative of the character or the data indicative of the width of said character.

32. In a photocomposing machine for producing a line of composition photographically on a film and having means for selecting characters to form said line of composition, the combination of a continuously rotatable system including as parts thereof a character carrier and a register, said character carrier having a series of characters spaced thereon adapted to be photographically reproduced to produce an image thereof upon said film and having coded data associated with each of said characters indicative of the width thereof, said register having a plurality of zones distributed around the periphery thereof of predetermined angular extent, means controlled by the sequence of the characters in the line for selecting a corresponding sequence of the zones of said register, means for magnetically recording in each zone of said register in the same sequence as that of the characters in the line data indicative of the character itself and of the width of that character, means for magnetically erasing the data indicative of the selected character, and separate means for erasing from said register the data indicative of the character widths.

33. In a photocomposing machine for producing a line of composition photographically on a film and having means for selecting characters to form said line of composition, the combination of a continuously rotatable system including as parts thereof a character carrier and a register, said character carrier having a series of characters spaced thereon adapted to be photographically reproduced to produce an image thereof upon said film and having coded data associated with each of said characters indicative of the width thereof, said register having a plurality of zones distributed around the periphery thereof of predetermined angular extent, means controlled by the sequence of the characters in the line for selecting a corresponding sequence of the zones of said register, magnetic means for recording in each zone of said register in the same sequence as that of the characters in the line data indicative of the character itself and of the width of that character, magnetic means for erasing the data indicative of the selected character, separate magnetic means for erasing from said register the data indicative of the character widths, and means for controlling said erasing means to effect said erasing from a single said zone or from all zones subsequent to a particular zone.

34. In a photocomposing machine for producing a line of composition photographically on a film and having means for selecting characters to form said line of composition, the combination of a continuously rotatable system including as parts thereof a character carrier and a register, said character carrier having a series of characters spaced thereon adapted to be photographically reproduced to produce an image thereof upon said film and having coded data associated with each of said characters indicative of the width thereof, said register having a plurality of zones distributed around the periphery thereof of predetermined angular extent, means controlled by the sequence of the characters in the line for selecting a corresponding sequence of the zones of said register, means for magnetically recording in each zone of said register in the same sequence as that of the characters in the line data indicative of the character itself and of the width of that character, means for magnetically erasing said recorded data from said register, and means for selectively controlling said erasing means to effect erasing from said register of the data thereon for a particular character in the line, of all characters in the line following a particular character, or of the entire line.

35. In a photocomposing machine for producing photographically a line of composition, the combination of means for selecting a sequence of characters and word spaces to form a line of composition, means including a magnetic register to store data indicative of said sequence of characters pending the use of said data in the printing of said characters, and means selectively under control of the operator for magnetically erasing from said register a single selected character in the line, all characters in the line following a particular character, or the entire line.

36. Photocomposing mechanism for producing photographically a justified line of composition on a film which includes means adapted to be operated to select a line of composition including at least one word space, a first counter responsive to the number of space units in the line plus a count for each word space in the line, means for setting said first counter to give a signal in response to the counting of a predetermined number of said space units, said count being representative of the number of space units per linear unit, a second counter, means controlled by said signals from said first counter for actuating said second counter to count the number of linear units in said line, means for setting said second counter to give a signal in response to the counting of a predetermined number of said linear units, means operable upon the occurrence of a word space for counting into said first counter the total width in space units of all the characters in the line, means also operable upon the occurrence of a word space for counting into said first counter a count of one space unit for each word space in the line and for continuing said word space count until the total count in said second counter equals the total width of the line in space units, and means controlled by the number of successive said additions of word space counts to determine the extent of advance of the film between words to control the space between words.

37. Photocomposing mechanism as defined in claim 36 including means for changing the setting of said first counter to correspond with a desired number of space units for each linear unit.

38. Photocomposing mechanism as defined in claim 36 including means for changing the setting of said second counter in accordance with a predetermined number of linear units in a line of composition.

39. Photocomposing mechanism as defined in claim 36 including means for advancing said film, and means correlated with said changing means for said first counter for varying the drive ratio of said film.

40. A photocomposing mechanism for producing photographically on a film a justified line of composition having a width of a predetermined number of linear units, comprising a continuously rotating system including a rotatable character carrier on which characters of different widths are arranged for individual projection, means for selecting a sequence of characters and word spaces to form a line of composition, means forming a part of said system for continuously advancing said film through one space unit for each revolution of said system, means for adjusting siad advancing means to a predetermined numerical relationship of space units to linear units, means for producing a plurality of character width pulses corresponding to the width in space units of each selected character, means for controlling the number of revolutions of said system and the corresponding advance of said film in space units in proportion to the number of pulses for each selected character, means for producing a plurality of word space pulses corresponding to the number of word spaces in the line, a first counter, adjusting means for presetting said first counter to emit a pulse whenever the total count thereon corresponds to said predetermined numerical relationship of space units to linear units, a second counter adapted to count the pulses emitted by said first counter, adjusting means for presetting said second counter to emit a pulse whenever the total count on said second counter equals said predetermined number of linear units in said line, means operable upon the occurrence of a word space for suspending the projection of characters to form a word space, means also operable upon the occurrence of a word space for counting once into said first counter the total number of character width pulses for the entire line, additional means operable upon the occurrence of a word space for counting into said first counter the total number of said word space pulses once for each revolution of said system with concurrent measured advance of the film to form the word space, and means operable in response to the emitted pulse from said second counter for resuming the projection of characters.

41. A photocomposing mechanism for producing photographically on a film a justified line of composition having a width of a predetermined number of linear units, comprising a continuously rotating system including a rotatable character carrier on which characters of different widths are arranged for individual projection, means for selecting a sequence of characters and word spaces to form a line of composition, means forming a part of said system for continuously advancing said film through one space unit for each revolution of said system, means for adjusting said advancing means to a predetermined numerical relationship of space units to linear units, means for producing a plurality of character width pulses corresponding to the width in space units of each selected character, means for controlling the number of revolutions of said system and the corresponding advance of said film in space units in proportion to the number of pulses for each selected character, means for producing a plurality of word space pulses corresponding to the number of word spaces in the line, a first counter, adjusting means for presetting said first counter to cause it to emit a pulse whenever the total count thereon corresponds to said predetermined numerical relationship of space units to linear units, a second counter adapted to count the pulses emitted by said first counter, adjusting means for presetting said second counter to cause it to emit a pulse whenever the total count on said second counter equals said predetermined number of linear units in said line, means operable upon the occurrence of a word space for counting once into said first counter the total number of character width pulses for the entire line, means also operable upon the occurrence of a word space for counting into said first counter the total number of said word space pulses once for each revolution of said system and continuing said counting until the pulse is emitted from said second counter with concurrent measured advance of the film to form the word space.

42. In a photocomposing machine for producing photographically a line of composition on a film, the combination of a continuously rotatable character carrier having thereon character images in separate zone positions each of definite angular extent and also having thereon space data associated with each character, a flashing source of illumination for projecting said images on said film, a rotatable pulse system synchronized with said character carrier, said pulse system comprising a plurality of pulse generators and a plurality of registers, one of said pulse generators being a marker pulse generator adapted to produce a single pulse for each revolution of said pulse system to establish a datum line position, a second of said pulse generators being a timing pulse generator adapted to produce a timing pulse for each of said zone positions, a third of said pulse generators being a code pulse generator adapted to produce a predetermined number of code pulses for each of said zone positions, pulse recording means associated with each of said registers for recording pulses in said zones in predetermined angular relation to said code pulses, spacing means controlled in accordance with the position of the pulses in certain of said registers for determining the intervals between flashes of said source of illumination, and means controlled in accordance with the position of the pulses in others of said registers for actuating said source in angular relation to the rotation of said carrier.

43. In a photocomposing machine for producing a line of composition photographically on a film, the combination of a character carrier having character images thereon adapted to be photographically reproduced upon said film, said characters being of different widths, coded data associated with said character carrier indicative of the widths of said characters, means for selecting a sequence of characters and word spaces to form a line of composition, an electrical circuit including a linear current responsive indicator, variable control means connected to said indicator for modifying the response thereof in proportion to the total width of said line, means for periodically rendering said circuit conductive for an interval corresponding to each character selected in the line of composition, means for controlling the length of said interval in proportion to the width of each of said characters, and means for periodically rendering said circuit conductive for a predetermined interval corresponding to each word space in the line, said indicator integrating said intervals with a resulting average indication corresponding to the percentage of set in the line.

44. In a photocomposing machine for producing a line of composition photographically on a film, the combination of a continuously rotatable character carrier having character images thereon of different widths adapted to be photographically reproduced upon said film, data associated with said carrier indicative of the widths of each of said characters, means for selecting a sequence of characters and word spaces to form a line of composition, a register for recording the total width of all the selected characters and a normal width of all the selected word spaces in the line, an electrical circuit including a linear current responsive indicator, variable control means connected to said indicator for modifying the response thereof in proportion to the total width of said line, means for periodically rendering said circuit conductive for an interval corresponding to each character selected in the line of composition, means controlled by said register for controlling the length of said interval in proportion to the width of each of said characters, and means controlled by said register for rendering said circuit conductive for a predetermined interval corresponding to each word space in the line, said indicator integrating said intervals with a resulting average indication corresponding to the percentage of set in the line.

45. In a photocomposing machine for producing a line of composition photographically on a film, the combination of a continuously rotatable character carrier having character images of different widths adapted to be photographically reproduced upon said film, coded data associated with said character indicative of the widths of each of said characters, means for selecting a sequence of characters and word spaces to form a line of composition, an electrical circuit including a linear current responsive indicator, variable control means connected to said indicator for modifying the response thereof in proportion to the total width of said line, means for periodically rendering said circuit conductive for an interval corresponding to each character selected in the line of composition, means for controlling the length of said interval in proportion to the width of each of said characters, additional variable control means connected to said indicator for modifying the response thereof in proportion to the selected point size of the selected characters, and means for periodically rendering said circuit conductive for a predetermined interval corresponding to each word space in the line, said indicator integrating said intervals with a resulting average indication corresponding to the percentage of set in the line.

46. A photocomposing machine for producing photographically a line of composition on a film which comprises a continuously rotating system including a character carrier and a magnetic pulse generating and recording device, said system being divided into a plurality of angularly related zones, said character carrier having character images in each of its zones adapted to be flashed to produce an image thereof upon said film, coded space data associated with said rotating system indicative of the width of each of the characters thereon, said magnetic device including a plurality of tracks, one of said tracks having a single pulse permanently recorded thereon forming a datum line position, a second of said tracks having a single pulse permanently recorded in each zone thereof marking the limits of each of said zones, a third of said tracks having a predetermined uniform number of permanently recorded pulses in each of the zone positions thereof, a typewriter having a carriage for selecting a sequence of characters to form a line of composition, means controlled by the actuation of the individual keys of said typewriter for selecting a zone of said character carrier with reference to said datum line position, means for picking up the coded data from the selected zone of said character carrier associated with the particular character selected, means controlled by the position of the carriage in the line for selecting a sequence of zones on said magnetic device, said magnetic device having a plurality of additional tracks forming registers for temporarily recording and storing data therein, means controlled by the actuation of the selected key of the typewriter for temporarily recording on said register coded data indicative of the selected character, and means controlled by said pickup means for recording in another track of the same zone of said register the data indicative of the width of said selected character.

47. A photocomposing machine for producing photographically a line of composition on a film which comprises a continuously rotating system including a character carrier, a pulse generating device and a magnetic pulse recording device, said system being divided into a plurality of angularly related zones, said character carrier having character images in each of its zones adapted to be flashed to produce an image thereof upon said film, coded space data associated with said character carrier indicative of the width of each of the characters thereon, said pulse generating device being formed integrally with said character carrier and including a plurality of tracks, one of said tracks having a single pulse permanently recorded thereon forming a datum line position, a second of said tracks having a single pulse permanently recorded in each zone thereof marking the limits of each of said zones, a third of said tracks having a predetermined uniform number of permanently recorded pulses in each of the zone positions thereof, a typewriter having a carriage for selecting a sequence of characters to form a line of composition, means including a presettable counter controlled by the actuation of the individual keys of said typewriter for selecting a zone of said character carrier with reference to said datum line position, means for picking up the coded data from the selected zone of said character carrier associated with the particular character selected, means including a presettable counter controlled by the position of the carriage in the line forming registers for selecting a sequence of zones on said magnetic device, means controlled by the actuation of the selected key of the typewriter for temporarily recording on one track of the selected zone of said register coded data indicative of the selected character, means controlled by said pickup means for recording in another track of the same zone of said register the data indicative of the width of said selected character, said typewriter carriage having a word space bar, and an additional track on said register for recording in the zone position corresponding to the position of the typewriter carriage upon each actuation of said word space bar data indicative of the occurrence of a word space.

48. A photocomposing machine for producing photographically a line of composition on a film which comprises a continuously rotating system including a character carrier and a magnetic pulse generating and recording device, said system being divided into a plurality of angularly related zones, said character carrier having character images in each of its zones adapted to be flashed to produce an image thereof upon said film, coded space data associated with said rotating system indicative of the width of each of the characters thereon, said magnetic device including a plurality of tracks, one of said tracks having a single pulse permanently recorded thereon forming a datum line position, a second of said tracks having a single pulse permanently recorded in each zone thereof marking the limits of each of said zones, a third of said tracks having a predetermined uniform number of permanently recorded pulses in each of the zone positions thereof, a typewriter having a carriage for selecting a sequence of characters to form a line of composition, means controlled by the actuation of the individual keys of said typewriter for selecting a zone of said character carrier with reference to said datum line position, means for picking up the coded data from the selected zone of said character carrier associated with the particular character selected, means controlled by the position of the carriage in the line for selecting a sequence of zones on said magnetic device, said magnetic device having a plurality of additional tracks forming registers for temporarily recording and storing data therein, means controlled by the actuation of the selected key of the typewriter for temporarily recording on said register coded data indicative of the selected character, means controlled by said pickup means for recording in another track of the same zone of said register the data indicative of the width of said selected character, said rotating system including means for continuously advancing the film in directly correlated relation with the rotation thereof, means controlled by the temporarily recorded data on said register for selecting the zone position of said character carrier with reference to said datum line position and for producing an instantaneous flash of light to project an image of the selected character on said film, and means controlled by the temporarily recorded data on said other track of said register for controlling the number of revolutions of said system to effect the spacing between successive flashings of adjacent characters.

49. A photocomposing machine for producing photographically a line of composition on a film which comprises a continuously rotating system including a character carrier and a magnetic pulse generating and recording device, said system being divided into a plurality of angularly related zones, said character carrier having character images in each of its zones adapted to be flashed to produce an image thereof upon said film, coded space data associated with said character carrier indicative of the width of each of the characters thereon, said magnetic device including a plurality of tracks, one of said tracks having a single pulse permanently recorded thereon forming a datum line position, a second of said tracks having a single pulse permanently recorded in each zone thereof marking the limits of each of said zones, a third of said tracks having a predetermined uniform number of permanently recorded pulses in each of the zone positions thereof, a typewriter having a carriage for selecting a sequence of characters to form a line of composition, means including a presettable counter controlled by the actuation of the individual keys of said typewriter for selecting a zone of said character carrier with reference to said datum line position, means for picking up the coded data from the selected zone of said character carrier associated with the particular character selected, means including a presettable counter controlled by the position of the carriage in the line forming registers for selecting a sequence of zones on said magnetic device, said magnetic device having a plurality of additional tracks for temporarily recording and storing data therein, means controlled by the actuation of the selected key of the typewriter for temporarily recording on said register coded data indicative of the selected character, means controlled by said pickup means for recording in another track of the same zone of said register the data indicative of the width of said selected character, said rotating system including means for continuously advancing the film in directly correlated relation with the rotation thereof, means controlled by the temporarily recorded data on said register for selecting the zone position of said character carrier and for producing an instantaneous flash of light to project an image of the selected character on said film, means controlled by the temporarily recorded data on said other track of said register for controlling the number of revolutions of said system to effect the spacing between successive flashings of adjacent characters, and means controlled by the temporarily recorded data in said word space register track for continuing the rotation of said system for a longer period to additionally advance the film between characters to form a word space.

References Cited in the file of this patent

UNITED STATES PATENTS

| | | | |
|---|---|---|---|
| 2,026,330 | Tauschek | Dec. 31, | 1935 |
| 2,348,535 | Goodale | May 9, | 1944 |
| 2,369,431 | Bryce | Feb. 13, | 1945 |
| 2,421,656 | Smith | June 3, | 1947 |
| 2,426,146 | Freund | Aug. 19, | 1947 |
| 2,441,899 | Ogden | May 18, | 1948 |
| 2,478,497 | Harrold | July 5, | 1949 |